(12) United States Patent
Davison

(10) Patent No.: US 11,013,294 B2
(45) Date of Patent: *May 25, 2021

(54) CONTOURED FLUID-FILLED CHAMBER

(71) Applicant: NIKE, Inc., Beaverton, OR (US)

(72) Inventor: Darren C. Davison, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,120

(22) Filed: Aug. 2, 2019

(65) Prior Publication Data

US 2019/0350311 A1 Nov. 21, 2019

Related U.S. Application Data

(60) Continuation of application No. 15/670,954, filed on Aug. 7, 2017, now Pat. No. 10,376,016, which is a
(Continued)

(51) Int. Cl.
*A43B 13/18* (2006.01)
*A43B 13/12* (2006.01)
(Continued)

(52) U.S. Cl.
CPC ............ *A43B 13/189* (2013.01); *A43B 13/12* (2013.01); *A43B 13/16* (2013.01); *A43B 13/18* (2013.01);
(Continued)

(58) Field of Classification Search
CPC ..... A43B 13/20; A43B 13/188; A43B 13/189; A43B 13/12; A43B 13/42; A43B 13/185; A43B 7/144
See application file for complete search history.

(56) References Cited

U.S. PATENT DOCUMENTS 1,869,257 A   7/1932 Hitzler
3,340,669 A   9/1967 Farquharson
(Continued)

FOREIGN PATENT DOCUMENTS

CN   1386053     12/2002
CN   1386053 A   12/2002
(Continued)

OTHER PUBLICATIONS

State Intellectual Property Office of People's Republic of China Notification of First Office Action for CN Application No. 201480039290.9, dated Mar. 21, 2017.
(Continued)

*Primary Examiner* — Jillian K Pierorazio
(74) *Attorney, Agent, or Firm* — Honigman LLP; Matthew H. Szalach; Jonathan P. O'Brien

(57) ABSTRACT

A sole structure for an article of footwear may include a chamber for receiving a pressurized fluid, the chamber having a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. The sole structure may also include a tensile member bonded to, and extending between, the first chamber barrier layer and the second chamber barrier layer. The sole structure may include a bond inhibiting material located between the tensile member and the first chamber barrier layer, the tensile member and the first chamber barrier layer being unbonded in an unbonded area in which the bond inhibiting material is disposed. The chamber may include an outwardly extending bulge in the unbonded area.

20 Claims, 21 Drawing Sheets

Related U.S. Application Data division of application No. 13/940,738, filed on Jul. 12, 2013, now Pat. No. 9,730,487.

(51) Int. Cl.

| | | |
|---|---|---|
| *A43B 13/42* | (2006.01) | |
| *B29C 65/00* | (2006.01) | |
| *B29D 35/12* | (2010.01) | |
| *A43B 13/20* | (2006.01) | |
| *B29D 35/14* | (2010.01) | |
| *A43B 13/16* | (2006.01) | |

(52) U.S. Cl.
CPC .......... *A43B 13/185* (2013.01); *A43B 13/188* (2013.01); *A43B 13/20* (2013.01); *A43B 13/42* (2013.01); *B29C 65/00* (2013.01); *B29D 35/122* (2013.01); *B29D 35/126* (2013.01); *B29D 35/142* (2013.01)

(56) References Cited

U.S. PATENT DOCUMENTS

| | | | |
|---|---|---|---|
| 4,183,156 | A | 1/1980 | Rudy |
| 4,219,945 | A | 9/1980 | Rudy |
| 4,936,029 | A | 6/1990 | Rudy |
| 5,022,109 | A | 6/1991 | Pekar |
| 5,042,176 | A | 8/1991 | Rudy |
| 5,245,766 | A | 9/1993 | Warren |
| 5,564,202 | A | 10/1996 | Hoppenstein |
| 5,575,088 | A | 11/1996 | Allen et al. |
| 5,713,141 | A | 2/1998 | Mitchell et al. |
| 5,952,065 | A | 9/1999 | Mitchell et al. |
| 6,013,340 | A | 1/2000 | Bonk et al. |
| 6,082,025 | A | 7/2000 | Bonk et al. |
| 6,127,026 | A | 10/2000 | Bonk et al. |
| 6,203,868 | B1 | 3/2001 | Bonk et al. |
| 6,321,465 | B1 | 11/2001 | Bonk et al. |
| 6,402,879 | B1 * | 6/2002 | Tawney ................. B29D 22/02 156/292 |
| 7,070,845 | B2 | 7/2006 | Thomas et al. |
| 7,076,891 | B2 | 7/2006 | Goodwin |
| 7,132,032 | B2 | 11/2006 | Tawney et al. |
| 7,210,249 | B2 | 5/2007 | Passke et al. |
| 7,234,183 | B2 | 6/2007 | Elrod et al. |
| 7,409,779 | B2 | 8/2008 | Dojan et al. |
| 7,622,014 | B2 * | 11/2009 | Millette ................. B29C 66/004 156/267 |
| 8,151,486 | B2 | 4/2012 | Dua |
| 8,241,451 | B2 | 8/2012 | Rapaport et al. |
| 8,479,412 | B2 | 7/2013 | Peyton et al. |
| 2001/0042321 | A1 | 11/2001 | Tawney et al. |
| 2006/0185197 | A1 | 8/2006 | Rhenter |
| 2007/0084082 | A1 * | 4/2007 | Dojan .................... A43B 7/144 36/29 |
| 2010/0107444 | A1 | 5/2010 | Aveni et al. |
| 2011/0131831 | A1 * | 6/2011 | Peyton .................. A43B 13/18 36/29 |
| 2011/0179672 | A1 | 7/2011 | Cheng |
| 2011/0277347 | A1 | 11/2011 | Monfils et al. |
| 2011/0277916 | A1 * | 11/2011 | Beye .................. B32B 3/06 156/145 |
| 2012/0084999 | A1 | 4/2012 | Davis et al. |
| 2012/0102782 | A1 | 5/2012 | Swigart et al. |
| 2012/0233878 | A1 | 9/2012 | Hazenberg et al. |
| 2012/0233879 | A1 | 9/2012 | Dojan et al. |
| 2013/0276329 | A1 * | 10/2013 | James .................. A43B 17/026 36/83 |

FOREIGN PATENT DOCUMENTS

| | | |
|---|---|---|
| CN | 102123623 | 7/2011 |
| CN | 102123623 A | 7/2011 |
| CN | 103025188 | 4/2013 |
| CN | 103025188 A | 4/2013 |
| WO | 0170064 | 9/2001 |
| WO | WO-0170064 A2 | 9/2001 |

OTHER PUBLICATIONS

Korean Intellectual Property Office, Office Action for KR Application No. 10-2016-7003547, dated May 11, 2017.
State Intellectual Property Office of the People's Republic of China, Notification to Make a Divisional Application for CN Application No. 201480039290.9, dated Sep. 26, 2016.
International Searching Authority, International Search Report and Written Opinion for WO Application No. PCT/US2014/043990, dated Sep. 23, 2014.
United States Patent and Trademark Office, Final Office Action for U.S. Appl. No. 13/940,738, dated Mar. 8, 2016.
United States Patent and Trademark Office, Non-final Office Action for U.S. Appl. No. 13/940,738, dated Oct. 1, 2015.
United States Patent and Trademark Office, Non-final Office Action for U.S. Appl. No. 13/940,738, dated Sep. 21, 2016.
United States Patent and Trademark Office, Notice of Allowance for U.S. Appl. No. 13/940,738, dated Jul. 14, 2017.
State Intellectual Property Office People's Republic of China, Office Action for CN Application No. 201480039290.9, dated Dec. 11, 2017.
State Intellectual Property Office (PRC), Office Action for CN Application No. 201480039290.9, dated Jun. 7, 2018.
State Intellectual Property Office, Notification to Make a Divisional Application for CN Application No. 201480039290.9, dated Sep. 26, 2016.
State Intellectual Property Office, Notification of First Office Action for CN Application No. 201480039290.9, dated Mar. 21, 2017.
Korean Intellectual Property Office, Office Action for KR Application No. 10-2016-7003547, dated May 11, 2017 (16 pages).
State Intellectual Property Office of the People's Republic of China, Notification to Make a Divisional Appplication for CN Application No. 201480039290.9, dated Sep. 26, 2016.
State Intellectual Property Office, Notification to Make a Divisional Application for CN Applicaiton No. 201480039290.9, dated Sep. 26, 2016.
State Intellectual Property Office, Notification of First Office Action for CN Applicaiton No. 201480039290.9, dated Mar. 21, 2017.
Korean Intellectual Property Office, Office Action for KR Applicaiton No. 10-2016-7003547, dated May 11, 2017 (16 pages).

* cited by examiner

CONTOURED FLUID-FILLED CHAMBER

CROSS REFERENCE TO RELATED APPLICATIONS

This application is a Continuation of U.S. application Ser. No. 15/670,954, filed Aug. 7, 2017, which is a Divisional of U.S. application Ser. No. 13/940,738, filed Jul. 12, 2013, the disclosures of which are hereby incorporated by reference in their entirety.

BACKGROUND

The present invention relates generally to fluid-filled chambers for use in the sole structure of an article of footwear.

Conventional articles of athletic footwear include two primary elements, an upper and a sole structure. The upper provides a covering for the foot that comfortably receives and securely positions the foot with respect to the sole structure. The sole structure is secured to a lower portion of the upper and is generally positioned between the foot and the ground. In addition to attenuating ground reaction forces (that is, providing cushioning) during walking, running, and other ambulatory activities, the sole structure may influence foot motions (for example, by resisting pronation), impart stability, and provide traction, for example. Accordingly, the upper and the sole structure operate cooperatively to provide a comfortable structure that is suited for a wide variety of athletic activities.

The upper is often formed from a plurality of material elements (for example, textiles, polymer sheets, foam layers, leather, synthetic leather) that are stitched or adhesively bonded together to define a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permit entry and removal of the foot from the void within the upper. In addition, the upper may include a tongue that extends under the lacing system to enhance adjustability and comfort of the footwear, and the upper may incorporate a heel counter.

The sole structure generally incorporates multiple layers: a sockliner, a midsole, and a ground-engaging outer member. The sockliner is a thin, compressible member located within the upper and adjacent to a plantar (that is, lower) surface of the foot to enhance footwear comfort. The midsole is secured to a lower surface of the upper and forms a middle layer of the sole structure. Many midsole configurations are primarily formed from a resilient polymer foam material, such as polyurethane (PU) or ethyl vinyl acetate (EVA), that extends throughout the length and width of the footwear. The midsole may also incorporate plates, moderators, and/or other elements that further attenuate forces, influence the motions of the foot, and/or impart stability, for example. The ground-engaging outer member may be fashioned from a durable and wear-resistant material (for example, rubber) that includes texturing to improve traction.

Further, the sole structure may include fluid-filled chambers to provide cushioning and stability. Upon inflation, such chambers experience pressure that is evenly distributed to all portions of the inner surface of the bladder material from which the chamber is formed. Accordingly, the tendency is for chambers, when inflated, to take on an outwardly rounded shape. For use as cushioning members in footwear, however, it is desirable to provide the chambers with a relatively flat form, to serve as a platform for receiving the sole of a foot of a wearer. Thus, to limit the expansion of the top and bottom portions of the chamber upon inflation, sole structures have been developed with chambers having one or more tensile structures that link the top portion of the chamber to the bottom portion of the chamber in order to maintain the chambers in a substantially planar configuration. However, it may be desirable to provide tensile member-equipped fluid-filled chambers with contoured configurations.

SUMMARY

The present disclosure is generally directed to fluid-filled chamber configurations having tensile members including a top sheet bonded to a top barrier layer of the chamber, a bottom sheet bonded to a bottom barrier layer of the chamber, and a plurality of tethers extending between the top sheet and the bottom sheet. In order to provide contours to the chamber, a bond inhibiting material may be incorporated between the top tensile member sheet and the top barrier layer and/or between the bottom tensile member sheet and the bottom barrier layer in select locations. The bond inhibiting material prevents the tensile member from bonding to the chamber barrier layer in select locations, enabling the chamber to bulge outward in those locations. Accordingly, a contoured chamber may be achieved using a tensile member having a substantially consistent thickness. In some embodiments, the chamber may be anatomically contoured. For example, various portions of the chamber may be contoured to have a concave configuration, in order to receive convex portions of the foot, such as a heel region, ball of the foot, or toes. Further, portions of the chamber may be contoured to have a convex configuration, in order to support concave portions of the foot, such as an arch region or the areas between toes.

In one aspect, the present disclosure is directed to an article of footwear having an upper and a sole structure secured to the upper. The sole structure may include a chamber for receiving a pressurized fluid, the chamber having a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. The sole structure may also include a tensile member bonded to, and extending between, the first chamber barrier layer and the second chamber barrier layer. In addition, the sole structure may include a bond inhibiting material located between the tensile member and the first chamber barrier layer, the tensile member and the first chamber barrier layer being unbonded in an unbonded area in which the bond inhibiting material is disposed. The chamber may include an outwardly extending bulge in the unbonded area.

In another aspect, the present disclosure is directed to an article of footwear having an upper and a sole structure secured to the upper The sole structure may include a chamber for receiving a pressurized fluid, the chamber having a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. The sole structure may also include a tensile member bonded to, and extending between, the first chamber barrier layer and the second chamber barrier layer. A first portion of the first chamber barrier layer and a second portion of the tensile member adjacent to the first portion of the first chamber barrier layer may be unbonded in an unbonded area, and the chamber may include an outwardly extending bulge in the unbonded area.

In another aspect, the present disclosure is directed to a method of forming a chamber for receiving a pressurized fluid. The method may include arranging a plurality of chamber components in a stacked arrangement, the chamber components including a first chamber barrier layer, a second chamber barrier layer, and a tensile member, wherein arranging the chamber components in a stacked arrangement involves locating the tensile member between the first chamber barrier layer and the second chamber barrier layer. The method may also include placing the stacked arrangement of chamber components into a mold, the mold including a first mold component and a second mold component. Further, the method may include joining the chamber components to one another by applying pressure to the stacked arrangement of chamber components. Joining the chamber components to one another may include bonding select portions of the first chamber barrier layer to the tensile member, thereby forming a bonded area and an unbonded area of the first chamber barrier layer and the tensile member. In addition, the method may include inflating the chamber with a pressurized fluid, the pressurized fluid expanding the unbonded area of the first chamber barrier layer, thereby forming a bulge in an outer surface of the chamber.

Other systems, methods, features and advantages of the current embodiments will be, or will become, apparent to one of ordinary skill in the art upon examination of the following figures and detailed description. It is intended that all such additional systems, methods, features and advantages be included within this description and this summary, be within the scope of the current embodiments, and be protected by the following claims.

BRIEF DESCRIPTION OF THE DRAWINGS

The invention can be better understood with reference to the following drawings and description. The figures are schematic representations of components of the disclosed invention. Accordingly, the components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
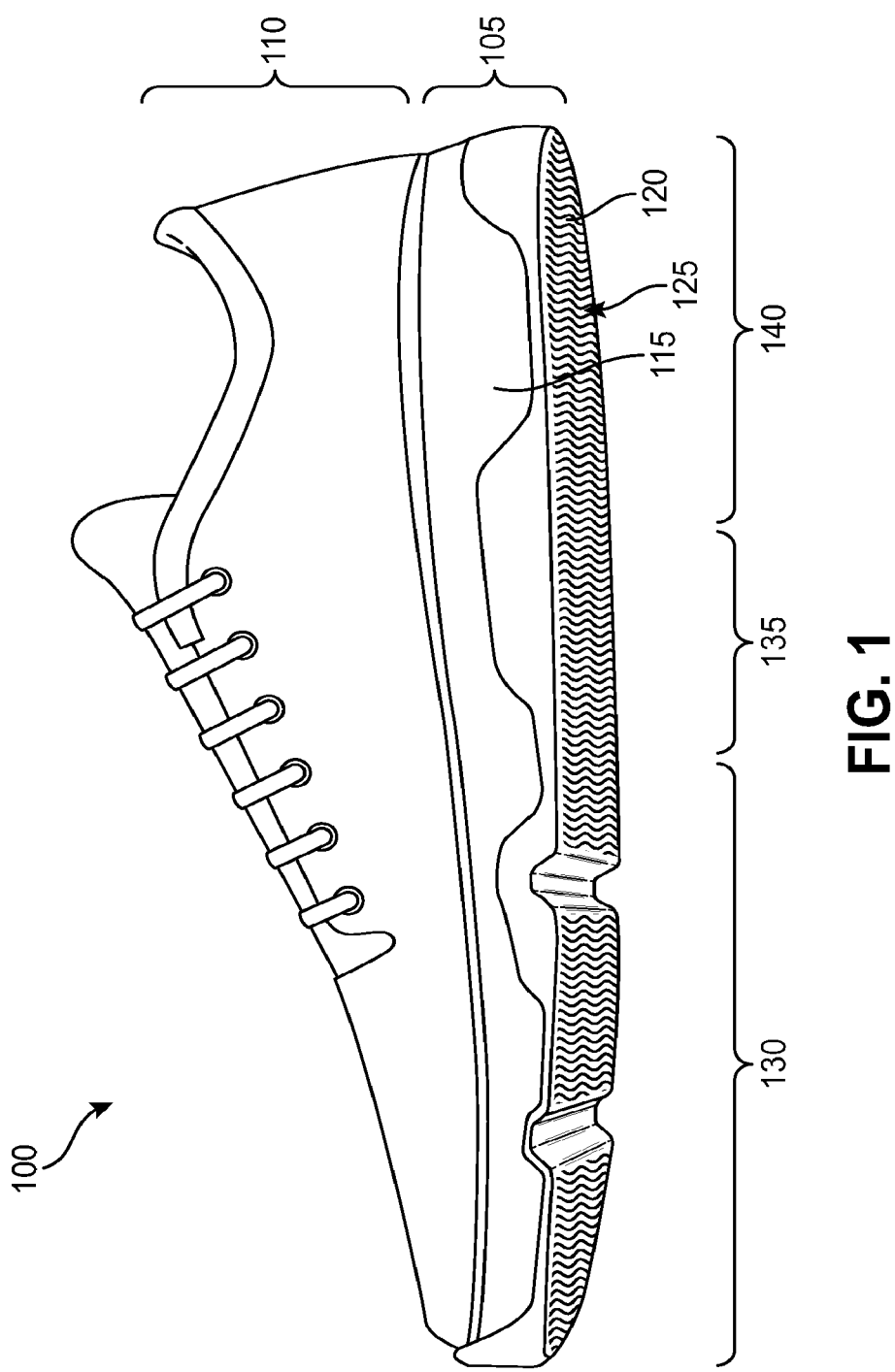
FIG. 1 shows an article of footwear according to an exemplary embodiment.

The following discussion and accompanying figures disclose a sole structure for an article of footwear. Concepts associated with the footwear disclosed herein may be applied to a variety of athletic footwear types, including running shoes, basketball shoes, cross-training shoes, cricket shoes, golf shoes, soccer shoes, baseball shoes, cycling shoes, football shoes, golf shoes, tennis shoes, and walking shoes, for example. Accordingly, the concepts disclosed herein apply to a wide variety of footwear types.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot.

The term "lateral axis," as used throughout this detailed description and in the claims, refers to an axis oriented in a lateral direction.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear in an upright position, with the sole facing groundward as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, chemical or molecular bonding, and/or other joining techniques. In addition, two components may be "fixedly attached" by virtue of being integrally formed, for example, in a molding process.

FIG. 1 depicts an embodiment of an article of footwear 100, which may include a sole structure 105 and an upper 110 secured to sole structure 105. As shown in FIG. 1 for reference purposes, footwear 100 may be divided into three general regions, including a forefoot region 130, a midfoot region 135, and a heel region 140. Forefoot region 130 generally includes portions of footwear 100 corresponding with the toes and the joints connecting the metatarsals with the phalanges. Midfoot region 135 generally includes portions of footwear 100 corresponding with an arch area of the foot. Heel region 140 generally corresponds with rear portions of the foot, including the calcaneus bone. Forefoot region 130, midfoot region 135, and heel region 140 are not intended to demarcate precise areas of footwear 100. Rather, forefoot region 130, midfoot region 135, and heel region 140 are intended to represent general relative areas of footwear 100 to aid in the following discussion.

Since sole structure 105 and upper 110 both span substantially the entire length of footwear 100, the terms forefoot region 130, midfoot region 135, and heel region 140 apply not only to footwear 100 in general, but also to sole structure 105 and upper 110, as well as the individual elements of sole structure 105 and upper 110. Footwear 100 may be formed of any suitable materials. In some configurations, the disclosed footwear 10 may employ one or more materials disclosed in Lyden et al., U.S. Pat. No. 5,709,954, issued Jan. 20, 1998, the entire disclosure of which is incorporated herein by reference.

Upper 110 may include one or more material elements (for example, textiles, foam, leather, and synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. Upper 110 may alternatively implement any of a variety of other configurations, materials, and/or closure mechanisms.

Sole structure 105 may have a configuration that extends between upper 110 and the ground and may be secured to upper 110 in any suitable manner. For example, sole structure 105 may be secured to upper 110 by adhesive attachment, stitching, welding, or any other suitable method. Sole structure 105 may include provisions for attenuating ground reaction forces (that is, cushioning and stabilizing the foot during vertical and horizontal loading). In addition, sole structure 105 may be configured to provide traction, impart stability, and/or limit various foot motions, such as pronation, supination, and/or other motions.

The configuration of sole structure 105 may vary significantly according to one or more types of ground surfaces on which sole structure 105 may be used. For example, the disclosed concepts may be applicable to footwear configured for use on indoor surfaces and/or outdoor surfaces. The configuration of sole structure 105 may vary based on the properties and conditions of the surfaces on which footwear 100 is anticipated to be used. For example, sole structure 105 may vary depending on whether the surface is harder or softer. In addition, sole structure 105 may be tailored for use in wet or dry conditions, for example by varying the tread pattern and traction elements.

Sole structure 105 may include multiple components, which may individually and/or collectively provide footwear 100 with a number of attributes, such as support, rigidity, flexibility, stability, cushioning, comfort, reduced weight, traction, and/or other attributes. As shown in FIG. 1, sole structure 105 may include a ground-contacting outer member 120. In addition, in some embodiments, sole structure 105 may also include a midsole 115 disposed between outer member 120 and upper 110.

Outer member 120 may include an outer surface 125 exposed to the ground. Outer member 120 may include various features configured to provide traction. For example, in some embodiments, outer surface 125 may include a patterned tread, as shown in FIG. 1. In some embodiments, outer member 120 may include one or more ground-engaging cleat members extending from outer surface 125.

Outer member 120 may be formed of suitable materials for achieving the desired performance attributes. For example, outer member 120 may be formed of any suitable polymer, composite, and/or metal alloy materials. Exemplary such materials may include thermoplastic and thermoset polyurethane, polyester, nylon, polyether block amide, alloys of polyurethane and acrylonitrile butadiene styrene, carbon fiber, poly-paraphenylene terephthalamide (para-aramid fibers, e.g., Kevlar®), titanium alloys, and/or aluminum alloys. In some embodiments, outer member 120 may be fashioned from a durable and wear-resistant material (for example, rubber). Other suitable materials, including future-developed materials, will be recognized by those having skill in the art. Materials and configurations for outer member 120 may be selected according to the type of activity for which footwear 100 is configured.

Midsole 115 may have any suitable configuration and may provide cushioning and stability. For example, in some embodiments, midsole 115 may be formed of a compressible material, such as a resilient polymer foam material, examples of which may include polyurethane (PU) or ethyl vinyl acetate (EVA). In some embodiments, midsole 115 may extend throughout the length and width of footwear 100. In some embodiments, midsole 115 may also incorporate incompressible plates, moderators, and/or other elements that further attenuate forces, influence the motions of the foot, and/or impart stability, for example.

In some embodiments, the sole structure may include one or more additional components that provide cushioning. For example, in some embodiments, the sole structure may include a chamber filled with pressurized fluid, such as one or more gases. The fluid-filled chamber may be compressible, and thus, may attenuate ground reaction forces.

Figure 2:
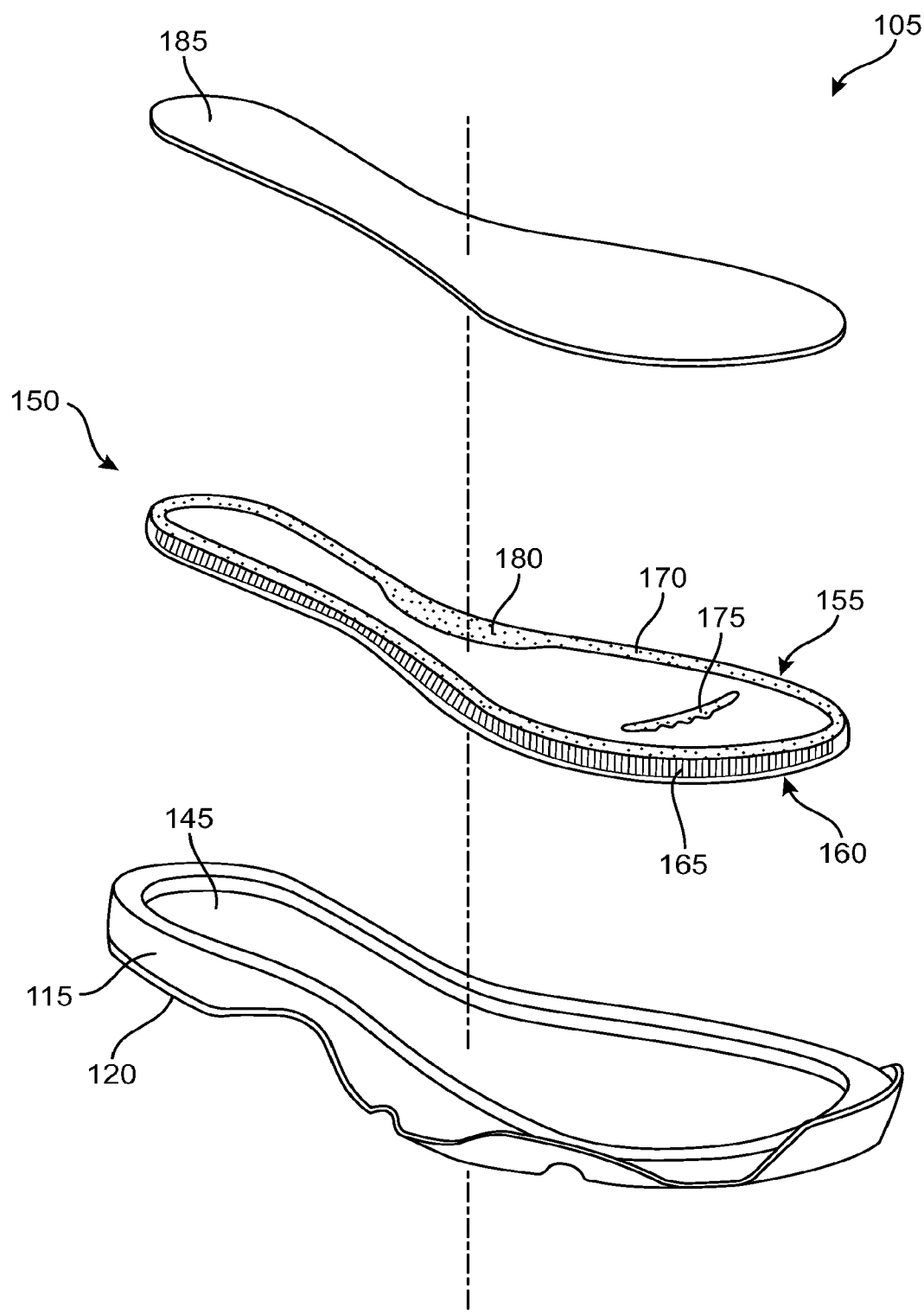
FIG. 2 shows an exploded view of an exemplary sole structure for an article of footwear.

FIG. 2 is an exploded view of sole structure 105. FIG. 2 shows midsole 115 and outer member 120 in an assembled configuration. As illustrated in FIG. 2, in some embodiments, midsole 115 may include a recess 145 configured to contain a cushioning element. For example, as shown in FIG. 2, in some embodiments, sole structure 105 may include a chamber 150 for receiving a pressurized fluid. Chamber 150 may be received within recess 145 in midsole 115.

In some embodiments, sole structure 105 may omit the midsole layer between chamber 150 and outer member 120. That is, chamber 150 may be secured directly to outer member 120 of sole structure 105. In some cases, such a configuration may provide sole structure 105 with a lower profile, that is, a reduced height. In some embodiments, midsole 115 may be located above chamber 150. That is, in some cases, chamber 150 may be disposed between midsole 115 and outer member 120.

In some embodiments, sole structure 105 may include an additional component on top of chamber 150. For example, sole structure 105 may include a footbed member 185. Footbed member 185 may form a covering over top of chamber 150, to conceal chamber 150 from an inner portion of the article of footwear. In addition, footbed member 185 may provide a surface or footbed configured to support the foot of a wearer directly.

In some embodiments, footbed member 185 may be removable. For example, in some embodiments, footbed member 185 may be a removable insole/sockliner. In other embodiments, footbed member 185 may be fixedly attached to one or more portions of the article of footwear. In some embodiments, footbed member 185 may be fixedly attached to midsole 115 about the periphery of recess 145, thereby enclosing chamber 150. In some embodiments, footbed member 185 may be a strobel. For example, footbed member may be fixedly attached to an upper of the article of footwear. In such a strobel embodiment, footbed member 185, when combined with the upper, may substantially completely enclose the foot of a wearer and isolate the wearer's foot from chamber 150. In some embodiments, footbed member 185 may include more than one component. For example, in some cases, a footbed member may include both an enclosing upper midsole portion and a strobe element attached to the upper.

Footbed member 185 may have any suitable configuration and any suitable material. For example, in some embodiments, footbed member 185 may be substantially incompressible. In such embodiments, footbed member 185 may be formed of rigid or semi-rigid materials such as hard plastics, carbon fiber, or other composite materials. In other embodiments, a substantially incompressible footbed member 185 may be formed of a relatively flexible material, such as a textile, leather, or synthetic leather. In some footwear embodiments that implement a substantially incompressible footbed member 185, an additional cushioning member, such as an insole/sockliner may be utilized on top of footbed member 185.

In some embodiments, footbed member 185 may be formed, at least in part, by a compressible material. For example, in some embodiments, footbed member 185 may be formed of a compressible foam material. Such a compressible foam material may enable footbed member 185 to conform to the features of a wearer's foot. In some embodiments, a compressible footbed member 185 may permanently deform to the shape of the wearer's foot. In other embodiments, the footbed member 185 may be resilient and return to its original shape after the footwear is removed from the wearer's foot.

Figure 3:
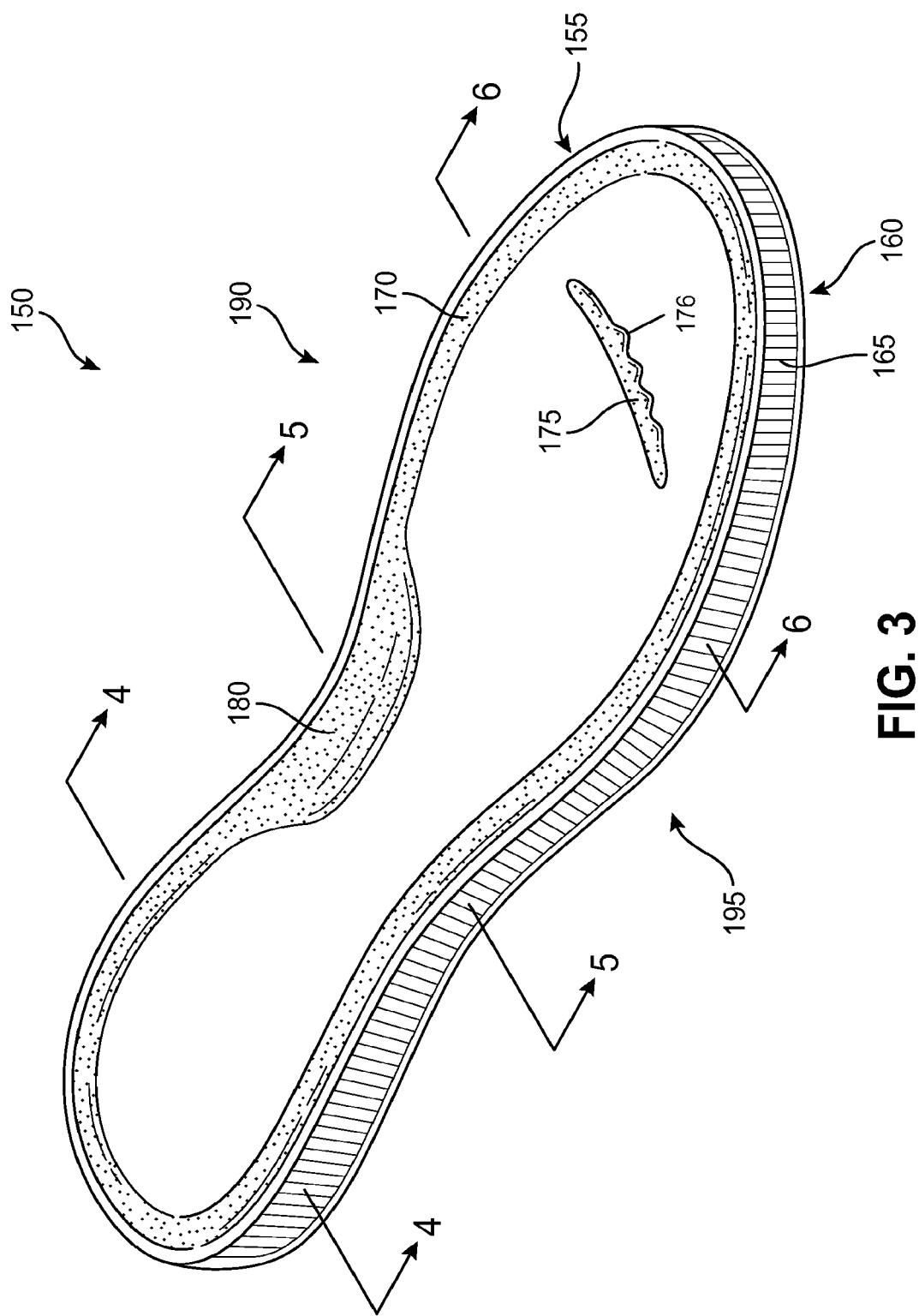
FIG. 3 shows a perspective view of the fluid-filled chamber of the sole structure shown in FIG. 2.

FIG. 3 is a more detailed illustration of chamber 150. As shown in FIG. 3, in some embodiments, chamber 150 may include a first chamber barrier layer 155 and a second chamber barrier layer 160. As shown in FIG. 3, in some embodiments, first chamber barrier layer 155 may be a top barrier layer and second chamber barrier layer 160 may be a bottom barrier layer. Second chamber barrier layer 160 may be bonded to first chamber barrier layer 155 about peripheral portions of first chamber barrier layer 155 and second chamber barrier layer 160 to define an interior void between first chamber barrier layer 155 and second chamber barrier layer 160.

Chamber 150 may be formed from a polymer or other bladder material that provides a sealed barrier for enclosing a fluid. As noted above, the bladder material may be transparent. A wide range of polymer materials may be utilized for chamber 150. In selecting materials for chamber 150, engineering properties of the material (e.g., tensile strength, stretch properties, fatigue characteristics, dynamic modulus, and loss tangent) as well as the ability of the material to prevent the diffusion of the fluid contained by chamber 150 may be considered. When formed of thermoplastic urethane, for example, the outer barrier of chamber 150 may have a thickness of approximately 1.0 millimeter, but the thickness may range from 0.25 to 2.0 millimeters or more, for example.

In addition to thermoplastic urethane, examples of polymer materials that may be suitable for chamber 150 include polyurethane, polyester, polyester polyurethane, and polyether polyurethane. Chamber 150 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for chamber 150 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al. The patents listed in this paragraph are incorporated herein by reference in their entirety.

The fluid within chamber 150 may range in pressure from zero to three-hundred-fifty kilopascals (i.e., approximately fifty-one pounds per square inch) or more. In some configurations of sole structure 105, a suitable pressure for the fluid may be a substantially ambient pressure. That is, the pressure of the fluid may be within five kilopascals of the ambient pressure of the atmospheric air surrounding footwear 100. The pressure of fluid within chamber 150 may be selected to provide desirable performance attributes. For example, higher pressures may provide a more responsive cushioning element, whereas lower pressures may provide more ground force attenuation (a softer cushion). The pressure of fluid within chamber 150 may be selected to work in concert with other cushioning elements of footwear 100, such as midsole 115 and footbed member 185.

In some configurations, chamber 150 may be inflated with substantially pure nitrogen. Such an inflation gas promotes maintenance of the pressure within chamber 150 through diffusion pumping, whereby the deficiency of other gases (besides nitrogen), such as oxygen, within chamber 150 biases the system for inward diffusion of such gasses into chamber 150. Further, bladder materials, such as those discussed above, may be substantially impermeable to nitrogen, thus preventing the escape of the nitrogen from chamber 150.

In some configurations, relatively small amounts of other gases, such as oxygen or a mixture of gasses, such as air, may be added to the nitrogen occupying most of the volume within chamber 150. In addition to air and nitrogen, the fluid contained by chamber 150 may include octafluorapropane or be any of the gasses disclosed in U.S. Pat. No. 4,340,626 to Rudy, such as hexafluoroethane and sulfur hexafluoride, for example. In some configurations, chamber 150 may incorporate a valve that permits the individual to adjust the pressure of the fluid. In other configurations, chamber 150 may be incorporated into a fluid system, as disclosed in U.S. Pat. No. 7,210,249 to Passke, et al., as a pump chamber or a pressure chamber. In order to pressurize chamber 150 or portions of chamber 150, the general inflation methods disclosed in Hensley et al., U.S. Pat. No. 8,241,450, issued Aug. 14, 2012, and entitled "Method For Inflating A Fluid-Filled Chamber," and Schindler et al., U.S. Pat. No. 8,863,408, issued Oct. 21, 2014, and entitled "Article Of Footwear Having A Sole Structure With A Fluid-Filled Chamber," (now U.S. Patent Application Publication No. US 2009/0151196, published Jun. 18, 2009), may be utilized. The patents and published patent applications listed in this paragraph are incorporated herein by reference in their entirety.

In some embodiments, the chamber may include one or more features that limit the expansion of the top and bottom portions of the chamber upon inflation. For example, in some embodiments, the chamber may include one or more tensile structures that link the top portion of the chamber to the bottom portion of the chamber. Such tensile structures may be substantially inelastic (or may have a limited elasticity) such that, when the chamber is inflated causing the top and bottom portions of the chamber to be biased apart from one another, the tensile structures limit the distance by which the top and bottom portions may be separated during inflation. Accordingly, the tensile structures may enable the bladder to retain its intended, substantially planar shape.

As shown in FIG. 3, a tensile structure, such as a tensile member 165 may extend between first chamber barrier layer 155 and second chamber barrier layer 160. Tensile member 165 may be bonded to first chamber barrier layer 155 and second chamber barrier layer 160. For example, in some embodiments, a thermoplastic (hot melt) adhesive may be used to bond tensile member 165 to first chamber barrier layer 155 and second chamber barrier layer 160. Tensile member 165 may have a limited elasticity and, therefore, may limit the extent to which first chamber barrier layer 155 and second chamber barrier layer 160 may be expanded away from one another upon inflation of chamber 150.

In order to provide contours to chamber 150, one or more areas of first chamber barrier layer 155 and/or second chamber barrier layer 160 may include bulges formed by the prevention of bonding between tensile member 165 and first chamber barrier layer 155 and/or second chamber barrier layer 160. That is, a first portion of first chamber barrier layer 155 and a second portion of tensile member 165 adjacent to the first portion of first chamber barrier layer 155 may be unbonded in an unbonded area. Chamber 150 may include an outwardly extending bulge in the unbonded area. Such a bulge may extend outwardly (e.g., upwardly) from adjacent portions of first chamber barrier layer 155.

In some embodiments, chamber 150 may include anatomical contours. That is, bulges in chamber 150 may correspond with the anatomical contours of corresponding portions of the foot of a wearer. For example, chamber 155 may include an anatomical contour formed, at least in part, by the bulges, wherein the anatomical contour is configured to receive a portion of a foot of a wearer. In some embodiments, such contours may have a standardized size and shape for a given shoe size. In other embodiments, such contours may be customized to suit a particular wearer's foot. In still other embodiments, the contours may be semi-customized. For example, a wearer may have an option to select a high arch support or a low arch support. Thus, the wearer may customize their footwear by selecting from a plurality of contours of various predetermined shapes and/or sizes.

As shown in FIG. 3, anatomical contours may include, for example, a peripheral bulge 170, which may extend around an outer periphery of first chamber barrier layer 155 of chamber 150 and may bulge upward from adjacent portions of first chamber barrier layer 155. Also, in some embodiments, a toe contour 175 may be incorporated in the forefoot region of chamber 150. Toe contour 175 may extend in a general direction from proximate a medial side 190 of chamber 150 toward a lateral side 195 of chamber 150. In addition, toe contour 175 may be configured to accommodate one or more toes of a wearer of the article of footwear. For example, as shown in FIG. 3, toe contour 175 may have one or more toe-separating contours 176 configured to be disposed at least partially between toes of a wearer. Further, in some embodiments, an arch support bulge 180 may be provided on medial side 190 of first chamber barrier layer 155, in a midfoot region of chamber 150.

Figure 4:
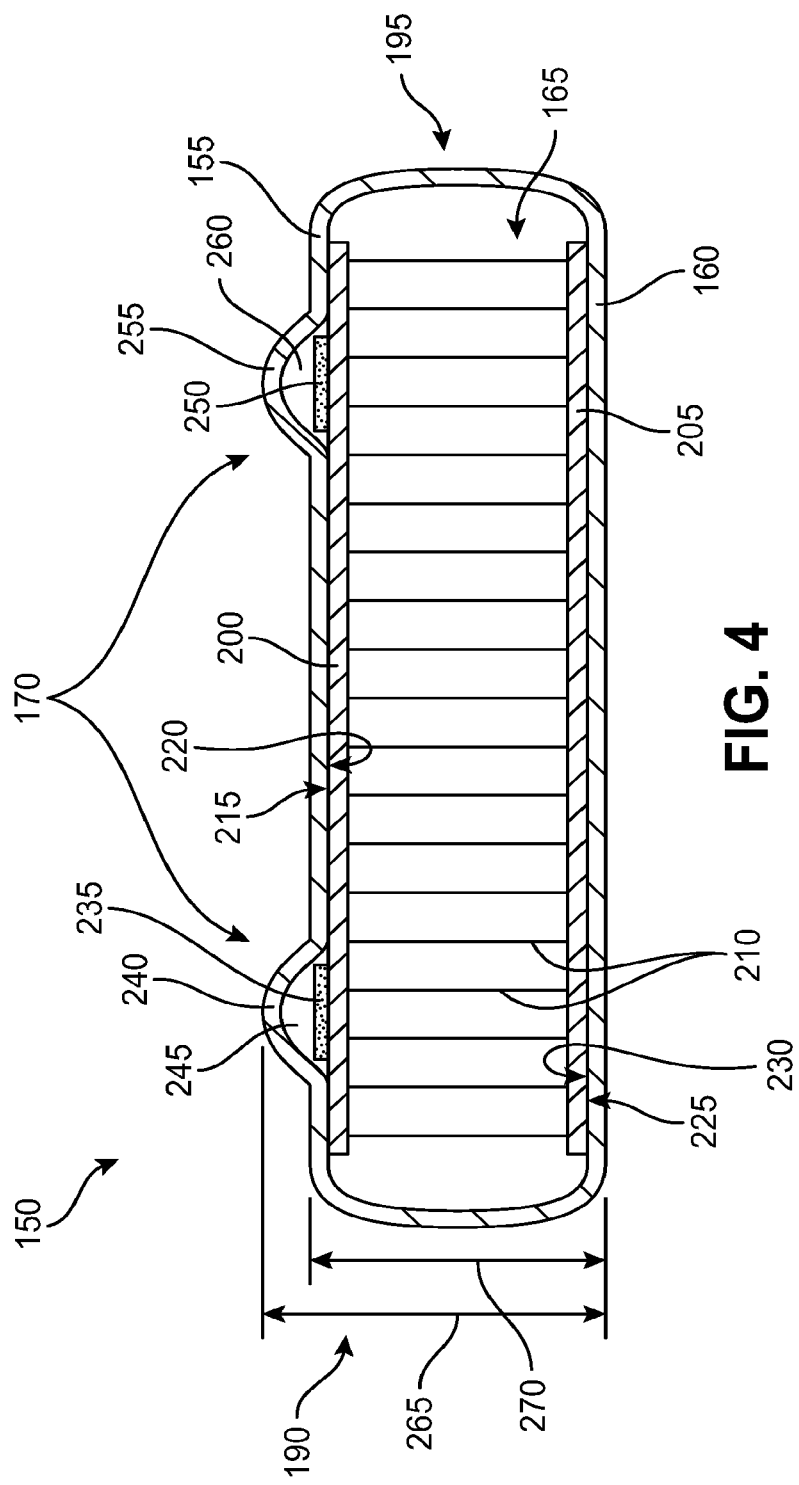
FIG. 4 is a cross-sectional view of a heel region of an exemplary sole structure chamber taken at section line 4-4 in FIG. 3.

FIG. 4 is a cross-sectional view of chamber 150 taken at section line 4-4 in FIG. 3, through a heel region of chamber 150. As shown in FIG. 4, tensile member 165 may include a first tensile member layer 200 bonded to first chamber barrier layer 155. For example, an upper surface 215 of first tensile member layer 200 may be bonded to a lower surface 220 of first chamber barrier layer 155. In addition, tensile member 165 may also include a second tensile member layer 205 bonded to second chamber barrier layer 160. A lower surface 225 of second tensile member layer 205 may be bonded to an upper surface 230 of second chamber barrier layer 160. Tensile member 165 may further include a plurality of tethers 210 connecting first tensile member layer 200 to second tensile member layer 205. The outward force of pressurized fluid within chamber 150 places tethers 210 in tension and restrains further outward movement of first tensile member layer 200 and first chamber barrier layer 155 away from second tensile member layer 205 and second chamber barrier layer 160.

Tensile member 165 may have any configuration suitable for limiting the distance between first chamber barrier layer 155 and second chamber barrier layer 160 of chamber 150 when inflated. For example, tensile member 165 may have any of the configurations disclosed in Dua, U.S. Pat. No. 8,151,486, issued Apr. 10, 2012, and entitled "Fluid-Filled Chamber with a Textile Tensile Member;" Peyton et al., U.S. Pat. No. 8,479,412, issued Jul. 9, 2013, and entitled "Tethered Fluid-Filled Chambers;" and Hazenberg et al., U.S. Pat. No. 9,375,049, issued Jun. 28, 2016, and entitled "Spacer Textile Materials and Methods for Manufacturing the Spacer Textile Materials," (now U.S. patent application Ser. No. 13/443,421, filed Apr. 10, 2012; the entire disclosures of which are incorporated herein by reference.

In some configurations, tethers 270 may include a plurality of substantially planar slats. In some configurations, such slats may be arranged in a substantially vertical orientation. In other embodiments, such slats may be angled with respect to first chamber barrier layer 155 and second chamber barrier layer 160. Further, such slats may be oriented in any suitable direction. For example, in some embodiments, the slats may be oriented in a substantially lateral direction. In other embodiments, the slats may be oriented in a substantially longitudinal direction. Other orientations are also possible. Tethers 210 may have any of the planar configurations disclosed in Dua, U.S. Pat. No. 8,151,486, issued Apr. 10, 2012, and entitled "Fluid-Filled Chamber with a Textile Tensile Member."

In some configurations, tethers 210 may include a plurality of strand-like members having a substantially one-dimensional configuration. For example, tethers 210 may each have a length between first tensile member layer 260 and second tensile member 265. This length may be substantially greater than the width or thickness of the one-dimensional tethers. Tethers 210 may have any of the one-dimensional configurations disclosed in Peyton et al., U.S. Pat. No. 8,479,412, issued Jul. 9, 2013, and entitled "Tethered Fluid-Filled Chambers."

Tethers 210 may be formed of any suitable material. For example in some embodiments, tethers 210 may be formed of a polymer material. In some embodiments, tensile member 165 may be formed of a three-dimensional fabric (3-D fabric). Tensile member 165 may be formed as a unitary (i.e., one-piece) textile element having the configuration of a spacer-knit textile. A variety of knitting techniques may be utilized to form tensile member 165 and impart a specific configuration (e.g., taper, contour, length, width, thickness) to tensile member 165. In general, knitting involves forming courses and wales of intermeshed loops of a yarn or multiple yarns. In production, knitting machines may be programmed to mechanically-manipulate yarns into the configuration of tensile member 165. That is, tensile member 165 may be formed by mechanically-manipulating yarns to form a one-piece textile element that has a particular configuration. The two major categories of knitting techniques are weft-knitting and warp-knitting. Whereas a weft-knit fabric utilizes a single yarn within each course, a warp-knit fabric utilizes a different yarn for every stitch in a course. In some embodiments, tensile member 165 may be formed using double needle bar Raschel knitting. In some embodiments, tensile member 165 may be formed using configurations disclosed in Hazenberg et al., U.S. Pat. No. 9,375,049, issued Jun. 28, 2016, and entitled "Spacer Textile Materials and Methods for Manufacturing the Spacer Textile Materials," (now U.S. patent application Ser. No. 13/443,421, filed Apr. 10, 2012).

In some embodiments, all of tethers 210 may have substantially the same length, thus providing tensile member 165 with a substantially constant thickness. In other embodiments, tethers 210 may have different lengths. In some embodiments, first tensile member layer 200 and second tensile member layer 205 may each have a generally continuous and planar configuration. In some embodiments, first tensile member layer 200 and second tensile member layer 205 may be substantially parallel to one another. In other embodiments, tensile member 165 may have a tapered configuration. For example, in some embodiments, tensile member 165 may have a tapered configuration between heel region 140 and forefoot region 130. In order to impart the tapered configuration, the lengths of tethers 210 may decrease between the heel region and forefoot region of chamber 150. Exemplary tapered chamber configurations are disclosed in Dua, U.S. Pat. No. 8,151,486, issued Apr. 10, 2012, and entitled "Fluid-Filled Chamber with a Textile Tensile Member."

In some embodiments, one or both of first tensile member layer 200 and second tensile member layer 205 may have a contoured configuration. For example, in some embodiments, first tensile member layer 205 may have a concave configuration to conform to the anatomical shapes of the foot. A depression in heel region 140 may cradle the heel of a wearer and more evenly distribute contact forces between chamber 150 and the foot of the wearer. Exemplary contoured chamber configurations are disclosed in Dua, U.S. Pat. No. 8,151,486, issued Apr. 10, 2012, and entitled "Fluid-Filled Chamber with a Textile Tensile Member;" and Peyton et al., U.S. Pat. No. 8,479,412, issued Jul. 9, 2013, and entitled "Tethered Fluid-Filled Chambers."

In some embodiments, a bond inhibiting material may be located between the tensile member and at least one of the chamber barrier layers, thus providing an unbonded area in which the tensile member and the chamber barrier layer may be unbonded. The bond inhibiting material may be a material that does not bond with either or both of the tensile member and the chamber barrier layer. For example in some embodiments, a thermoplastic adhesive material may be used to bond the tensile member and the chamber barrier layer together. Such a thermoplastic adhesive (hot melt) may be activated by heat to bond these components together. The bond inhibiting material may be a material that does not melt or otherwise bond with at least one of the adjacent components during the heating process that activates the thermoplastic adhesive. Accordingly, following the heating process, any portions of the chamber barrier layer that were masked from the thermoplastic adhesive material by a bond inhibiting material will remain unbonded to the tensile member.

Exemplary bond inhibiting materials may include any suitable materials that prevent bonding between chamber barrier layers and a tensile member. The type of bond inhibiting material used may vary according to the type of chamber barrier layer and tensile member used. In some embodiments, the bond inhibiting material may be a material that does not significantly melt during heating performed to activate adhesive used to bond the chamber barrier layers to the tensile member. For example, in some embodiments, the bond inhibiting material may be a high temperature polymer.

In some embodiments, heating of the chamber components to bond the chamber barrier layers to the tensile member may be performed using radio frequency (RF) heating. Accordingly, exemplary bond inhibiting materials may be RF resistant materials. Examples of such RF resistant materials that may be used as bond inhibiting materials include fiberglass, polytetrafluoroethylene, nylon, cellophane tape, and thermal printing label materials.

In some embodiments, bond inhibiting strips may include an adhesive material on one side. For example, bond inhibiting strips may include an adhesive on one side in order to secure the bond inhibiting strips to the chamber barrier layer or to the tensile member. Adhesive may be omitted from the opposite side of the bond inhibiting strips in order to prevent the opposite side from being secured to the other component. For example, in some embodiments, an adhesive may be used to attach a bond inhibiting strip to the hot melt adhesive material sheet used to bond the chamber barrier layer to the tensile member. The opposite side of the bond inhibiting strip may be free of adhesive, and further may be formed of a material that does not bond to the chamber barrier layer during heating and/or application of pressure.

In some embodiments, the bond inhibiting material may be transient. That is, the bond inhibiting material may be blended into the adjacent components during the assembly process. For example, in some embodiments, the bond inhibiting material may mix with the adhesive material of the hot melt adhesive sheet and the resulting mixture may soak into the fabric of a tensile member. Accordingly, the final chamber structure may not have a discrete bond inhibiting layer or hot melt adhesive layer. In some embodiments, the bond inhibiting material may be a liquid material that functions similar to a non-stick cooking spray. By spraying such a bond inhibiting material onto one or more of the chamber layers, bonding may be prevented between such layers.

As shown in FIG. 4, peripheral bulge 170 may extend on both medial side 190 and lateral side 195 of chamber 150, thereby forming a medial bulge 240 and a lateral bulge 255. Medial bulge 240 and lateral bulge 255 may extend upward from adjacent portions of first chamber barrier layer 155. Accordingly, medial bulge 240 and lateral bulge 255, when combined with first chamber barrier layer 155 between medial bulge 240 and lateral bulge 255, may form a concavity configured to receive a heel of a wearer. That is, chamber 155 may include a depression, or heel cup, in the heel region of chamber 155. Accordingly, in some embodiments, medial bulge 240 and/or lateral bulge 255 may form a convexity that, when combined with an outer surface of chamber 150, forms a concavity. In some embodiments, the concavity formed may be larger (e.g., have a larger general radius of curvature) than the convexity of the bulge.

A medial bond inhibiting material 235 may be located between first tensile member layer 200 and first chamber barrier layer 155. Consequently, tensile member 165 and first chamber barrier layer 155 may be unbonded in an unbonded area corresponding with the location in which medial bond inhibiting material 235 is disposed. As shown in FIG. 4, in the unbonded area, a medial void 245 may be formed between tensile member 165 and first chamber barrier layer 155 within medial bulge 240. As shown in FIG. 4, tensile member 165 may be continuous across the unbonded area.

In some embodiments, first chamber barrier layer 155 may have a substantially planar configuration in the bonded area in which first chamber barrier layer 155 is bonded to tensile member 165. As shown in FIG. 4, the unbonded area of first chamber barrier layer 155 may bulge outward beyond the plane in which the bonded area of first chamber barrier layer 155 lies. The bulged area of chamber 150 may have an increased thickness. For example, as shown in FIG. 4, bonded areas of chamber 150 may have a first thickness 270, whereas unbonded areas of chamber 150 may have a second thickness 265 that is greater than the first thickness 270.

In some embodiments, the voids within the bulges may be isolated from the remainder of chamber 150. In such embodiments, the voids may be inflated separately from the rest of chamber 150. Alternatively, the voids may be inflated along with the rest of chamber 150 and then sealed off to isolate the voids.

In some embodiments, the voids within the bulges may be in fluid communication with the remainder of chamber 150. Accordingly, pressurized fluid within chamber 150 may fill and pressurize medial void 245. In some embodiments, for example, a porous tensile member may be used. For example, a fabric tensile member may permit pressurized fluid from chamber 150 to enter into the voids within the bulges formed in the unbonded areas.

In some embodiments, first chamber barrier layer 155 may be substantially inelastic. Accordingly, increasing pressure of the fluid within voids formed by bulges in the chamber barrier layers may not substantially increase the volume, width, or height of medial void 245. Differences in the pressure of the fluid within such voids may vary the compressibility of the bulges. For example, higher pressure within the bulges may decrease the compressibility of the bulges.

Lateral bulge 255 may be formed by a lateral bond inhibiting material 250. Lateral bond inhibiting material 250 may prevent bonding between first chamber barrier layer 155 and tensile member 165 in an unbonded area. When pressurized, lateral bulge 255 may define a lateral void 260 between first chamber barrier layer 155 and tensile member 165.

Figure 5:
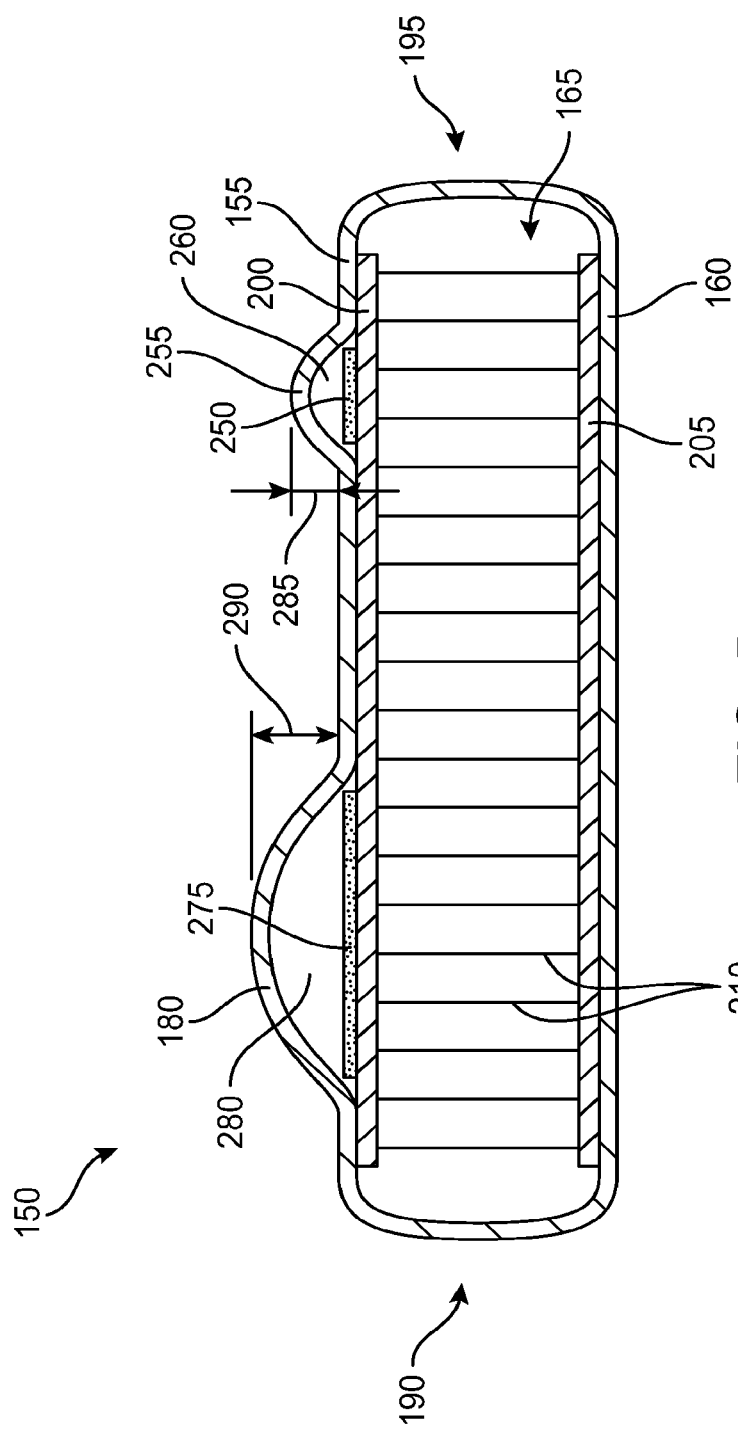
FIG. 5 is a cross-sectional view of a midfoot region of an exemplary sole structure chamber taken at section line 5-5 in FIG. 3.

FIG. 5 is a cross-sectional view of the midfoot region of chamber 150 taken at section line 5-5 in FIG. 3. As shown in FIG. 5, arch support bulge 180 may be disposed on medial side 190 of chamber 150. Arch support bulge 180 may be formed by an unbonded area of first chamber barrier layer 155 in which an arch area bond inhibiting strip 275 is disposed between first chamber barrier layer 155 and tensile member 165. Arch support bulge 180 may define an arch support bulge void 280.

As also shown in FIG. 5, lateral bulge 255 may extend into the midfoot region of chamber 150. As shown in FIG. 5, lateral bulge 255 may extend away from adjacent portions of first chamber barrier layer 155 by a first distance 285. Arch support bulge 180 may extend away from adjacent portions of first chamber barrier layer 155 by a second distance 290. In some embodiments, the thickness of arch support bulge 180 may be greater than lateral bulge 255, and thus, second distance 290 may be greater than first distance 285.

Figure 6:
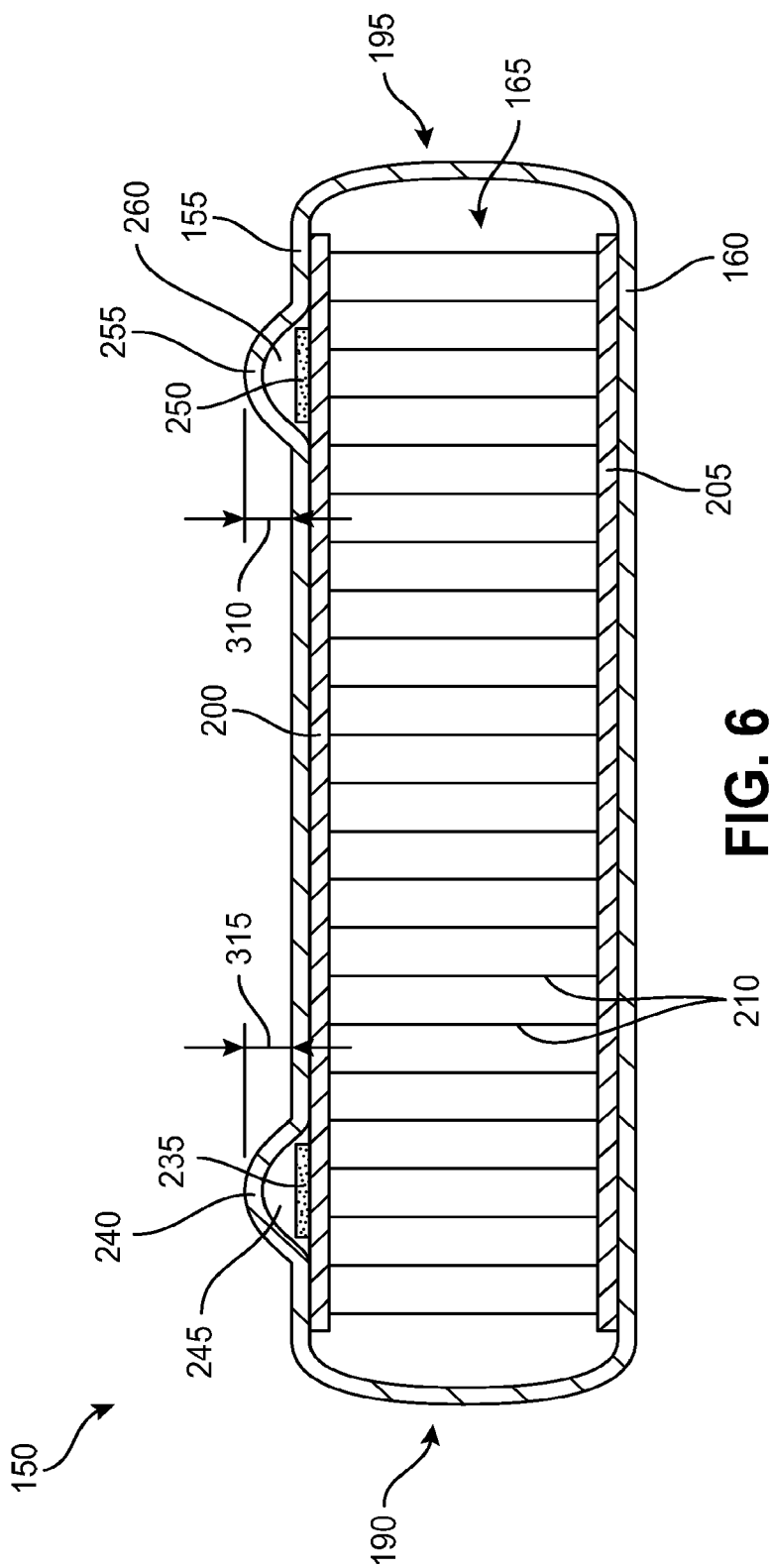
FIG. 6 is a cross-sectional view of a heel region of an exemplary sole structure chamber taken at section line 6-6 in FIG. 3.

FIG. 6 is a cross-sectional view of the forefoot region of chamber 150 taken at section line 6-6 in FIG. 3. As shown in FIG. 6, in some embodiments, medial bulge 240 may have a substantially similar cross-sectional size and/or shape as lateral bulge 255. Accordingly, lateral bulge 255 may extend from adjacent portions of first chamber barrier layer 155 by a first distance 310 and medial bulge 240 may extend from adjacent portions of first chamber barrier layer 155 by a second distance 315 that is substantially the same as first distance 310.

Figure 7:
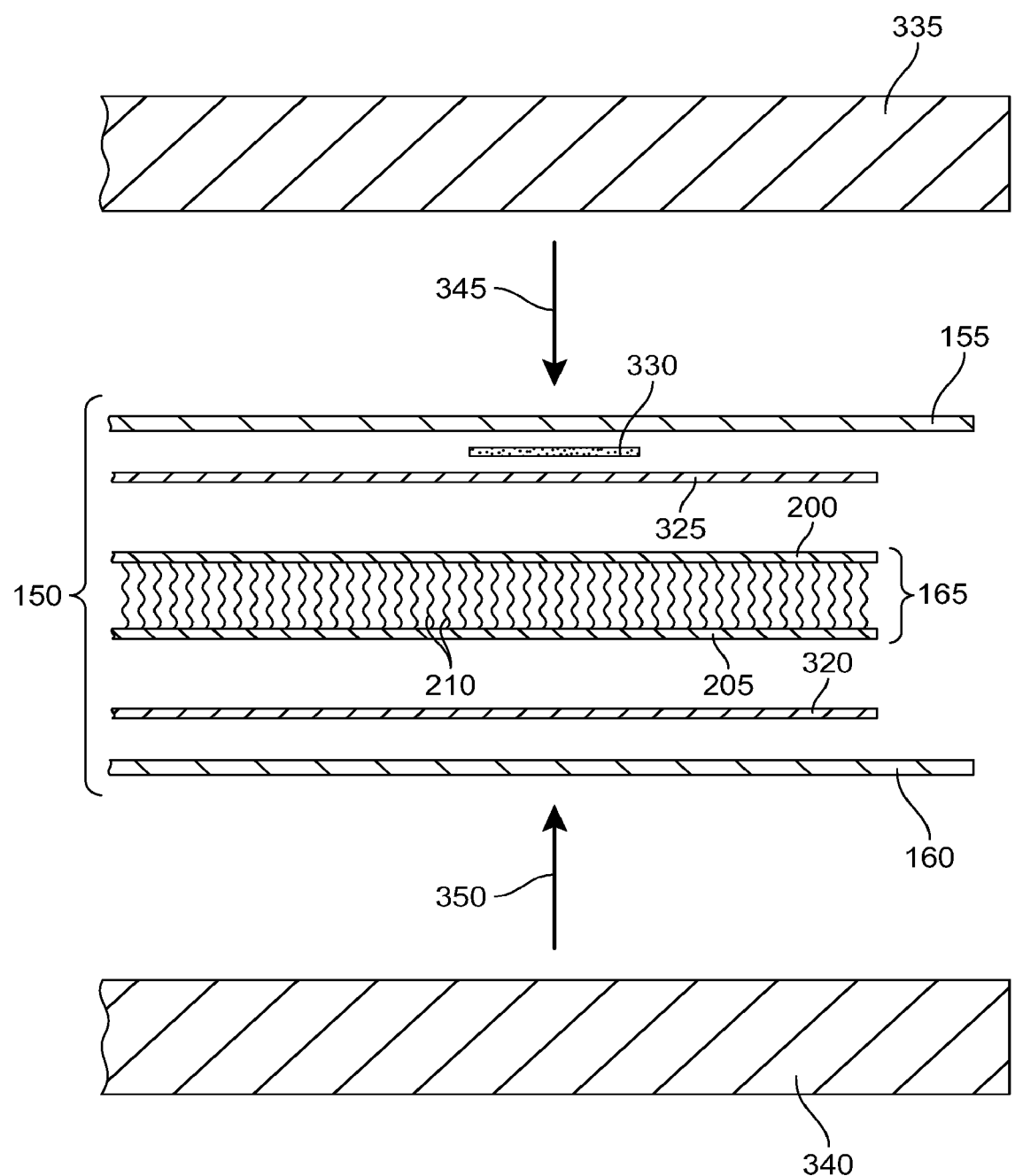
FIG. 7 shows an exploded view of chamber components and a mold for joining the chamber components.

FIG. 7 shows an exploded view of components of chamber 150 and a mold for joining the chamber components. Further, FIG. 7 illustrates aspects of a method of forming chamber 150. For purposes of illustration, FIG. 7 shows a portion of chamber 150. The method of assembling the chamber components may include applying pressure by compressing a stacked arrangement of the components of chamber 150 between a first mold component 335 and a second mold component 340. Accordingly, arranging the plurality of chamber components in a stacked arrangement may involve locating tensile member 165 between first chamber barrier layer 155 and second chamber barrier layer 160. The method may include placing the stacked arrangement of chamber components into the first mold. The method may further include applying pressure to the stacked arrangement of chamber components to join the chamber components to one another. This compression may be accomplished by applying force with first mold component 335 in a direction indicated by a first arrow 345 and/or by applying an opposite force with second mold component 340 in an opposite direction indicated by a second arrow 350.

FIG. 7 also shows a first adhesive layer 325 between first chamber barrier layer 155 and first tensile member layer 200 and a second adhesive layer 320 between second chamber barrier layer 160 and second tensile member layer 205. First adhesive layer 325 and second adhesive layer 320 may be any suitable adhesive for joining the barrier layers to the tensile member layers. For example, in some embodiments, first adhesive layer 325 and second adhesive layer 320 may include a hot melt adhesive, such as a thermoplastic material. First adhesive layer 325 and second adhesive layer 320 are omitted from other drawings of the application for purposes of clarity.

As shown in FIG. 7, the method of assembling the chamber components may include placing a bond inhibiting material 330 between first chamber barrier layer 155 and first adhesive layer 325. Alternatively, in some embodiments, bond inhibiting material 330 may be located between first adhesive layer 325 and first tensile member layer 200 of tensile member 165. This alternative configuration may also prevent bonding of first chamber barrier layer 155 to tensile member 165.

In some embodiments, bond inhibiting material 330 may be attached, on one side, to a layer of chamber 150. For example, in some embodiments, bond inhibiting material 330 may include an adhesive material on one side. This may enable bond inhibiting material 330 to be attached to one layer of chamber 150 to preventing undesired shifting of bond inhibiting material 330 during assembly. For example, in some embodiments in which bond inhibiting material 330 is disposed between first chamber barrier layer 155 and first adhesive layer 325 as shown in FIG. 7, bond inhibiting material 330 may be adhesively attached to a top side of first adhesive layer 325. In such embodiments, bond inhibiting material 330 may inhibit bonding with first chamber barrier layer 155. Alternatively, bond inhibiting material 330 may be adhesively attached to first chamber barrier layer 155, and may prevent bonding to first adhesive layer 325. In such embodiments, bond inhibiting material 330 may be a material that does not bond to first adhesive material 325 when first adhesive material 325 is activated (heated).

In some embodiments in which bond inhibiting material 330 is disposed between first adhesive layer 325 and first tensile member layer 200, bond inhibiting material 330 may be adhesively attached to a bottom side of first adhesive layer 325, and may inhibit bonding with first tensile member layer 200. Alternatively, bond inhibiting material may be adhesively attached to first tensile member layer 200 and may inhibit bonding with first adhesive layer 325.

Figure 8:
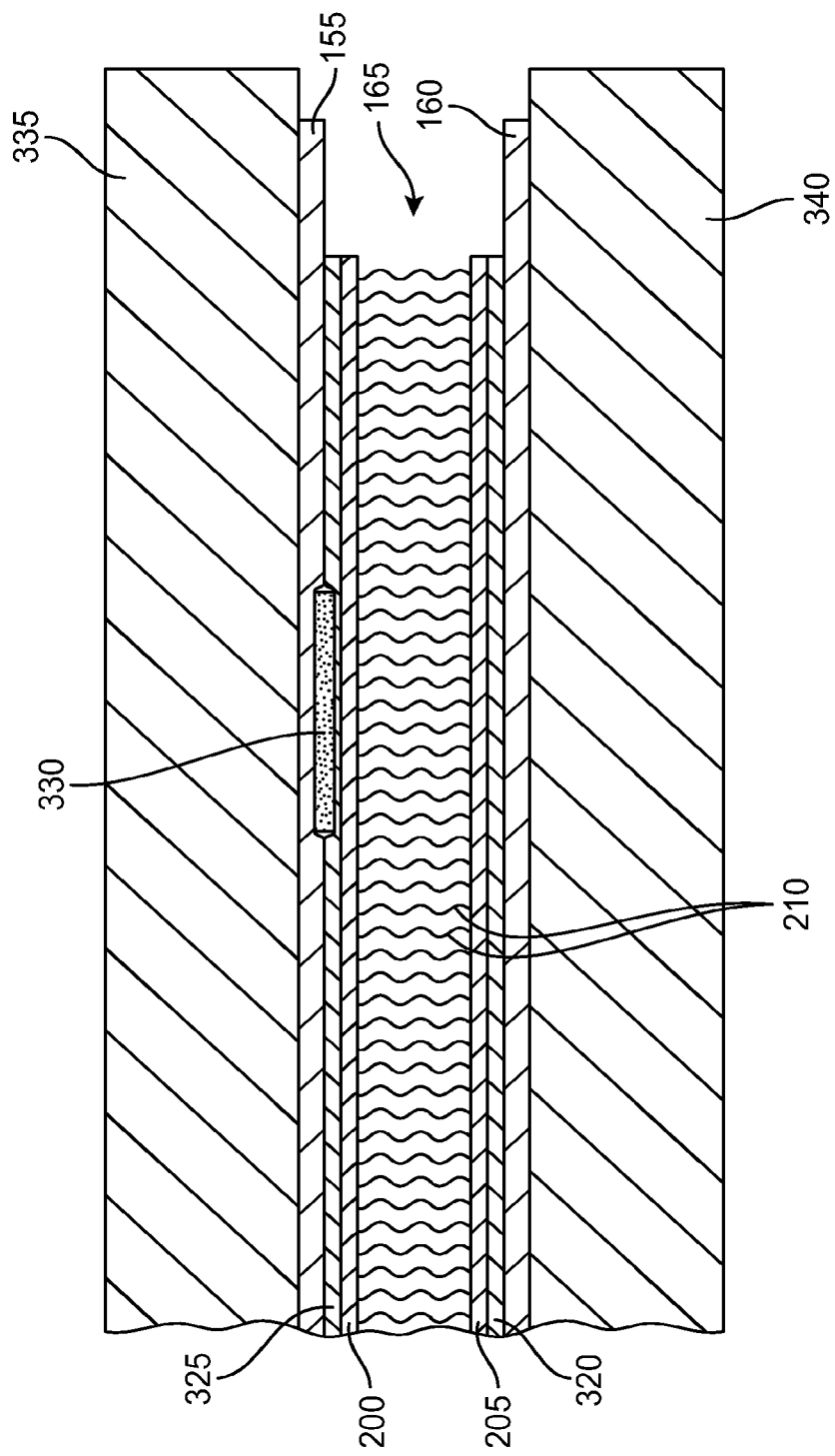
FIG. 8 shows the mold and chamber components shown in FIG. 7 in a compressed condition.

It will be noted that FIG. 7 illustrates a schematic representation of the process of assembling chamber 150. In some embodiments, all layers may be attached in a single compression of the chamber components. In other embodiments, select components may be attached to one another in a first process to form one or more sub-assemblies, and the sub-assemblies may be joined together in a separate, second process. For example, in some embodiments, first adhesive layer 325 may be attached to first tensile member layer 200, and second adhesive layer 320 may be attached to second tensile member layer 205 in a preliminary bonding process to form a sub-assembly. The sub assembly may then be joined to bond inhibiting material 330, first chamber barrier layer 155, and second chamber barrier layer 160 using heat and compression, for example as shown in FIG. 8. In some embodiments, an intermediate step may involve the attachment of bond inhibiting material 330 to a chamber component, such as first adhesive layer 325, prior to executing the bonding process illustrated in FIG. 8. Exemplary methods of attaching bond inhibiting material to chamber components are discussed in greater detail below with respect to FIGS. 16-19.

FIG. 8 shows the mold and chamber components shown in FIG. 7 in a compressed condition. First mold component 335 has been moved closer to second mold component 340, pressing the chamber components against each other. When the chamber components are compressed, tethers 210 may be in a slack condition, that is, untensioned, as illustrated by the wavy appearance of tethers 210 in FIG. 8. In some embodiments, heat may be applied to the chamber components while under compression, in order to facilitate the bonding of the chamber barrier layers to the tensile member. Thus, joining the chamber components to one another may be performed by applying pressure to the stacked arrangement of chamber components, as described above. In some embodiments, joining the chamber components to one another may include bonding select portions of first chamber barrier layer 155 to tensile member 165, thereby forming a bonded area and an unbonded area of first chamber barrier layer 155 and tensile member 165.

In some embodiments, after the first mold is used to join the chamber barrier layers to the tensile member, a second mold may be used to seal the peripheral portions of the chamber barrier layers. In some embodiments, once the peripheral portions are sealed with the second mold, the chamber may be inflated with a pressurized fluid. In some embodiments, the inflation may be performed while the chamber resides in the second mold.

Figure 9:
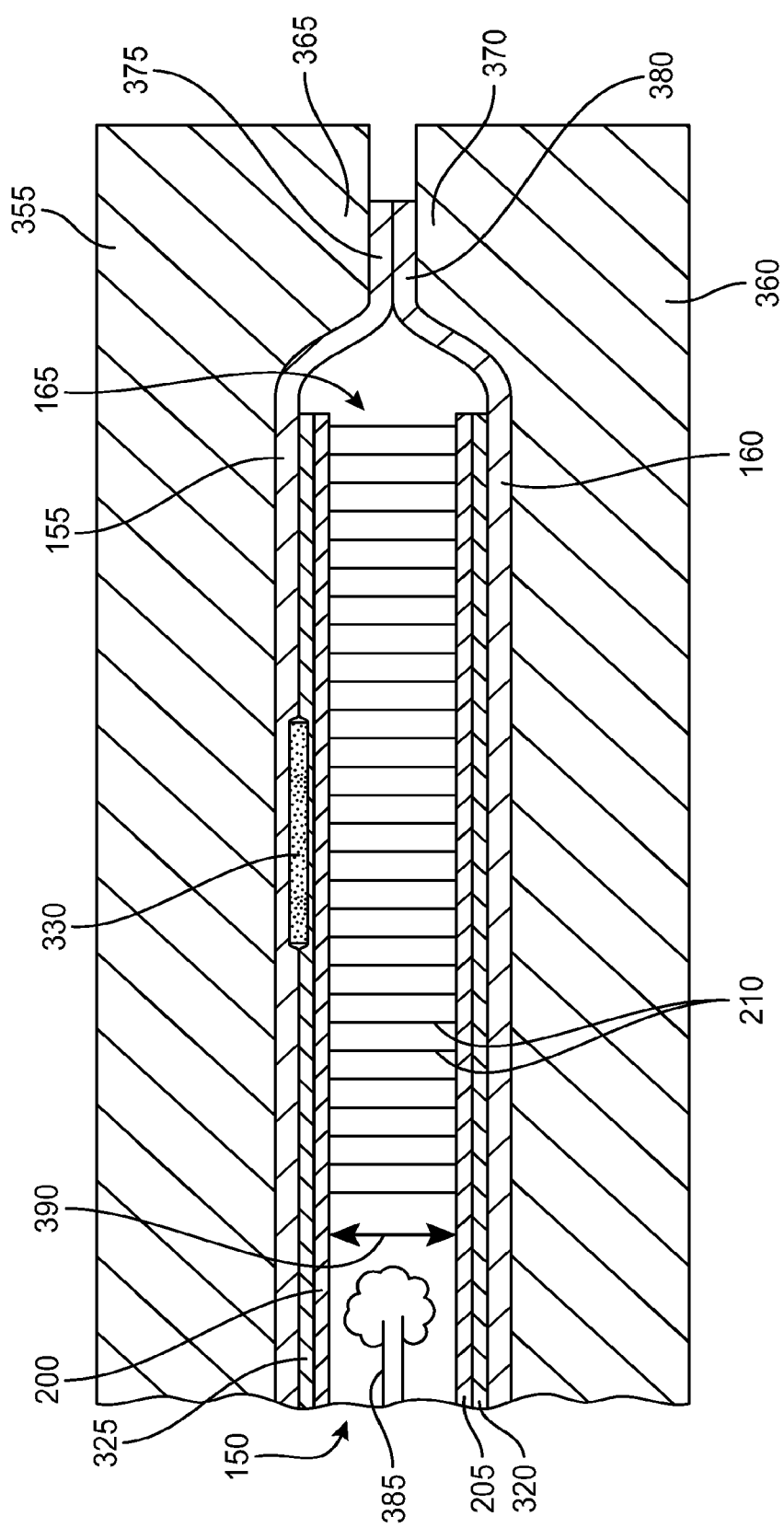
FIG. 9 shows a second mold joining the peripheral portions of the chamber components to one another.

FIG. 9 shows a second mold joining the peripheral portions of the chamber components to one another. The second mold may include a third mold component 355 and a fourth mold component 360. Third mold component 355 may include a first peripheral mold projection 365 extending toward fourth mold component 360. Fourth mold component 360 may include a second peripheral mold projection 370 extending toward third mold component 355. As shown in FIG. 9, when third mold component 355 and fourth mold component 360 are compressed together, a first peripheral barrier layer portion 375 of first chamber barrier layer 155 may be compressed against and joined to a second peripheral barrier layer portion 370 of second chamber barrier layer 160 between first peripheral mold projection 365 and second peripheral mold projection 370.

As also shown in FIG. 9, in some embodiments, chamber 150 may be inflated with a pressurized fluid 385. In some embodiments, the injection of pressurized fluid 385 may be performed while chamber 150 is compressed within the second mold. Upon pressurization, the top and bottom sides of chamber 150 may be extended up and down, respectively, as indicated by an arrow 390. This inflation of chamber 150 may extend tethers 210 and place tethers 210 in tension. This tension is illustrated in FIG. 9 by the substantially straight configuration of tethers 210.

Figure 10:
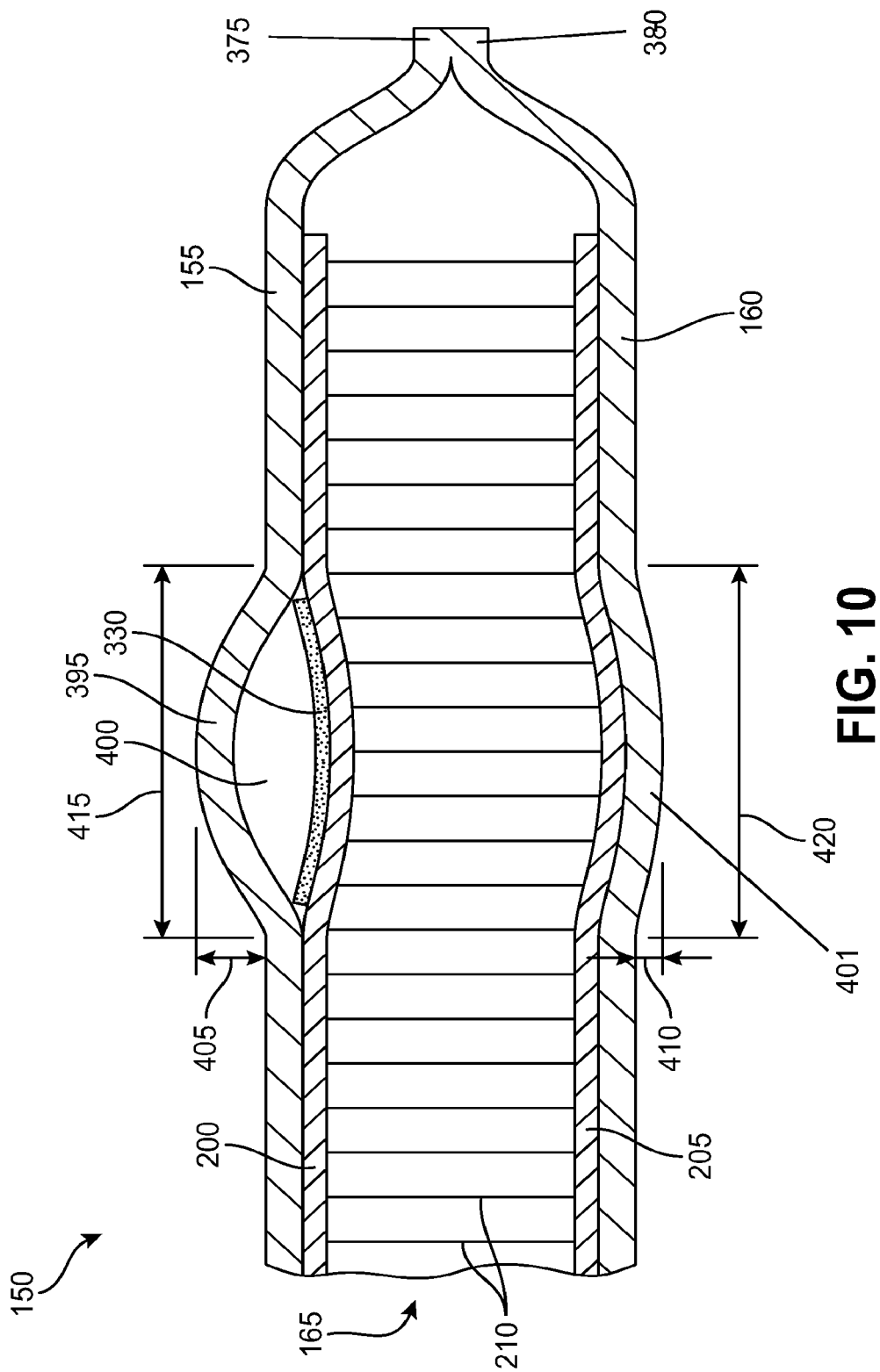
FIG. 10 shows an assembled, cross-sectional view of an exemplary fluid-filled chamber.

FIG. 10 shows an assembled, cross-sectional view of a portion of chamber 150. As shown in FIG. 10, first peripheral barrier layer portion 375 of first chamber barrier layer 155 is joined to second peripheral barrier layer portion 380 of second chamber barrier layer 160. In some embodiments, the joinder of these portions of chamber 150 may form a flange, which may be trimmed after or during the sealing of first peripheral barrier layer portion 375 to second peripheral barrier layer portion 380.

Tethers 210 of tensile member 165 may extend across the interior void within chamber 150 and are placed in tension by the outward force of the pressurized fluid upon first chamber barrier layer 155 and second chamber barrier layer 160. Thus, tensile member 165, may prevent chamber 150 from expanding outward, thereby ensuring that the intended shape of chamber 150 is retained. Whereas the peripheral bond of first peripheral barrier layer portion 375 to second peripheral barrier layer portion 380 joins the polymer sheets to form a seal that prevents the fluid from escaping, tensile member 165 prevents chamber 150 from expanding outward or otherwise distending due to the pressure of the fluid. That is, tensile member 165 effectively limits the expansion of chamber 150 to retain an intended shape of surfaces of first chamber barrier layer 155 and second chamber barrier layer 160.

Due to the inclusion of bond inhibiting material 330, a portion of first chamber barrier layer 155 is prevented from bonding with first tensile member layer 200 of tensile member 165. Accordingly, upon pressurization of chamber 150 with a fluid, the unbonded portion of first chamber barrier layer 155 may expand outward, thus forming a first bulge 395 in the outer surface of chamber 150. The pressurized fluid may fill a void 400 within first bulge 395.

In some embodiments, pressurization of chamber 150 may expand a portion of chamber 150 disposed on an opposite side of chamber 150 than bulge 395. For example, pressurization may expand a second bulge 401 away from adjacent portions of second chamber barrier layer 160 on the opposite side of chamber 150 from first bulge 395.

A pressurized fluid will apply even pressure on all interior surfaces of the chamber. This will cause portions of the chamber barrier layers that are not anchored to the opposite side of the chamber to expand outward. In bonded areas, the distance between first chamber barrier layer 155 and second chamber barrier layer may be limited by the thickness of tensile member 165, which is bonded to the two barrier layers. In the unbonded areas, in which at least one of the chamber barrier layers is not bonded to tensile member 165, there is no structure tying first chamber barrier layer 155 to second chamber barrier layer 160. Therefore, when first chamber barrier layer 155 extends outward to form first bulge 395, the corresponding portion of second chamber barrier layer 160 opposite first bulge 395 may tend to extend away from adjacent portions of second chamber barrier layer 160, thus forming second bulge 401. Although the area of second chamber barrier layer forming first bulge 401 may be bonded to tensile member 165, that portion of tensile member 165 is not bonded to first chamber barrier layer 155. Accordingly, tensile member 165 is not anchored at the ends of tethers 210 opposite second bulge 401, thus allowing tensile member 165 to deflect with the extension of second chamber barrier layer 160 at second bulge 401.

In some embodiments, the size and shape of first bulge 395 may be substantially the same. In other embodiments, the size and/or shape of first bulge 395 may be at least slightly different from the size and/or shape of second bulge 401. As shown in FIG. 10, first bulge 395 may have a first width 415 and a first height 405. Second bulge 401 may have a second width 420 and a second height 410. As shown in FIG. 10, first width 415 of first bulge 395 may be the same or substantially the same as second width 420 of second bulge 401. In some embodiments, however, first width 415 may be different than second width 420. For example, in some embodiments, second width 420 may be smaller than first width 415. In such embodiments, since tensile member 165 is bonded to first chamber barrier layer 160, the structure of tensile member 165 proximate to second bulge 401 may restrict the amount to which second chamber barrier layer 160 may bulge outward to form second bulge 401.

In addition, in some embodiments, first height 405 of first bulge 395 may be the same or substantially the same as second height 410 of second bulge 401. In other embodiments, however, first height 405 may be different than second height 410. For example, as shown in FIG. 10, second height 410 may be smaller than first height 405. In some embodiments, the smaller second height 410 may be due to the attachment of tensile member 165 to second chamber barrier layer 160, as described above.

Figure 11:
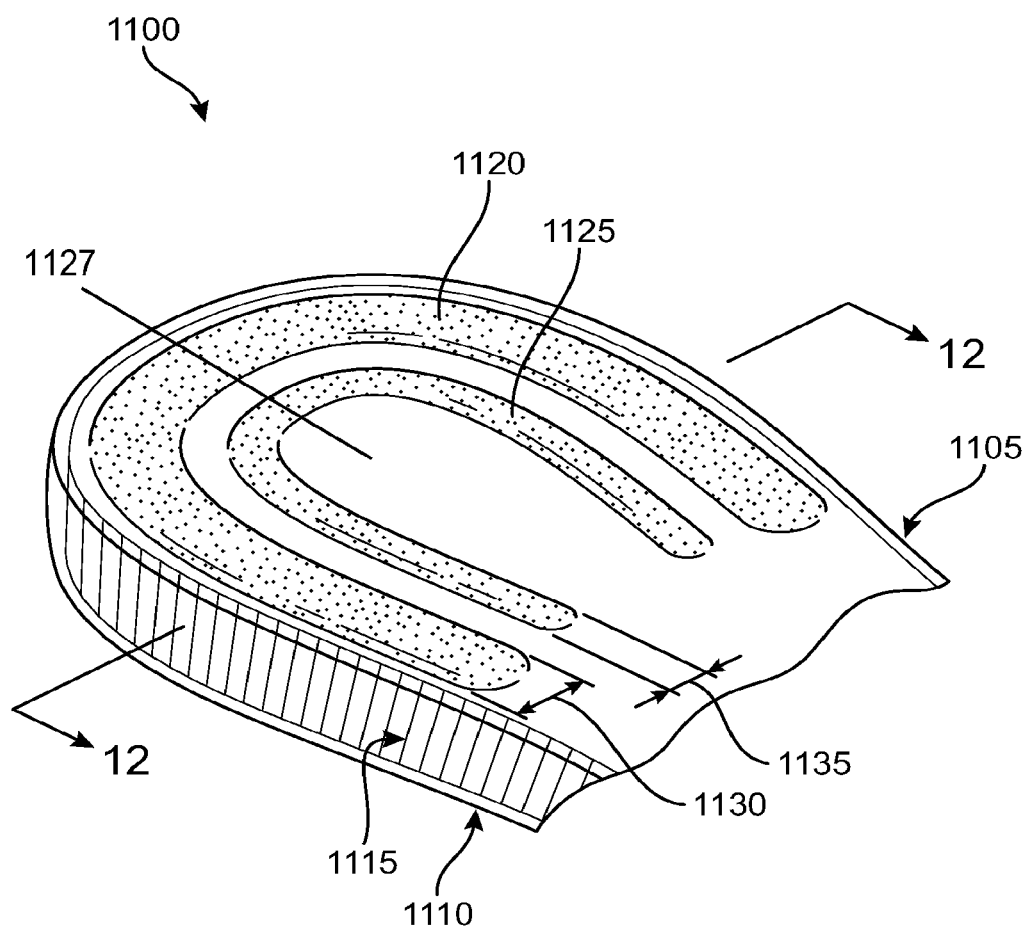
FIG. 11 shows a heel region of another exemplary fluid-filled chamber.

FIG. 11 shows a heel region of another exemplary fluid-filled chamber. FIG. 11 shows a chamber 1100 including a first chamber barrier layer 1105 and a second chamber barrier layer 1110. Chamber 1100 may also include a tensile member 1115. The characteristics of these components may be the same or similar to corresponding components of other embodiments discussed herein.

In some embodiments, chamber 1100 may include an anatomical contour formed by two bulges proximate one another. For example, as shown in FIG. 11, chamber 1100 may include a first elongate bulge 1120 and a second elongate bulge 1125. First elongate bulge 1120 and second elongate bulge 1125 may form two arced bulges arranged substantially concentrically about a center portion 1127 of a heel region of chamber 1100. That is, first elongate bulge 1120 and second elongate bulge 1125 may be parallel to one another about the periphery of the heel region.

In order to provide a more curved contour, elongate bulges having different widths may be disposed proximate to one another. For example, a chamber may have a first bulged portion corresponding with a first portion of bond inhibiting material, the first portion of bond inhibiting material having a first width. In addition, the chamber may include a second bulged portion corresponding with a second portion of bond inhibiting material, the second portion of bond inhibiting material having a second width. In some embodiments, the first width may be greater than the second width.

As shown in FIG. 11, first elongate bulge 1120 may have a first width 1130 and second elongate bulge 1120 may have a second width 1135. In some embodiments, first width 1130 may be greater than second width 1135, as shown in FIG. 11.

Figure 12:
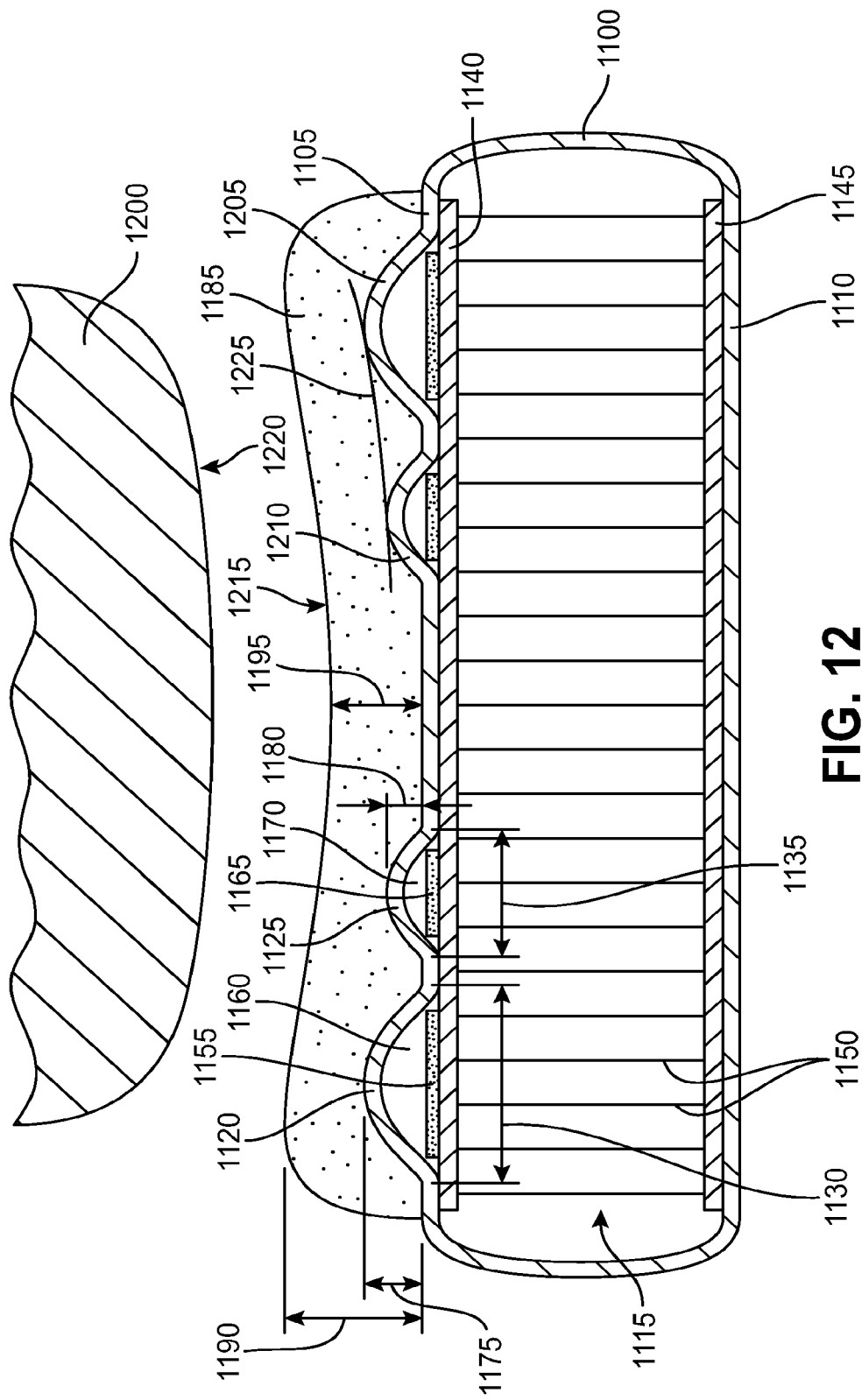
FIG. 12 shows a cross-sectional view of a sole structure including the chamber shown in FIG. 11 taken at section line 12-12 in FIG. 11.

FIG. 12 shows a cross-sectional view of a sole structure including the chamber shown in FIG. 11 taken at section line 12-12 in FIG. 11. FIG. 12 also shows a lower portion of a foot 1200. As illustrated in FIG. 12, the sole structure may include a footbed member 1185 disposed on first chamber barrier portion 1105 of chamber 1100. An upper surface 1215 of footbed member 1185 may be configured to receive a lower surface 1220 of foot 1200. It will be noted that, in some embodiments, additional layers, such as insoles (sockliners), strobels, sole plates, inner sole boards, and/or midsole layers may be provided above and/or below footbed member 1185.

As further shown in FIG. 12, tensile member 1115 may include a first tensile member layer 1140, a second tensile member layer 1145, and a plurality of tethers 1150 arranged substantially similarly to other embodiments disclosed herein. Chamber 1100 may also include a first bond inhibiting strip 1155 and a second bond inhibiting strip 1165, which may prevent portions of first chamber barrier layer 1105 from bonding with tensile member 1115, thus forming a first void 1160 and a second void 1170, respectively within first elongate bulge 1120 and second elongate bulge 1125.

FIG. 12 again shows the difference between first width 1130 of first elongate bulge 1120 and second width 1135 of second elongate bulge 1120. This difference between first width 1130 of first elongate bulge 1120 and second width 1135 of second elongate bulge 1120 may correspond with a similar difference in width between first bond inhibiting strip 1155 and second bond inhibiting strip 1165.

The amount to which a bulged portion of a chamber barrier layer extends away from adjacent portions of the chamber barrier layer may correspond with a width of span of the bulged portion. For example, a bulged portion may have a length and a width extending in directions that are substantially parallel to a plane substantially containing substantially planar portions of the chamber barrier layer. In addition, the bulged portion may have a height by which the bulged portion extends away from adjacent portions of the chamber barrier layer. The height of the bulged portion may be limited by the shorter of the length and the width of the bulged portion. That is, whichever of the length and the width is shortest will have the most limiting effect on the height of the bulged portion.

As shown in FIG. 12, first elongate bulge 1120 may extend from adjacent portions of first chamber barrier layer 1105 by a first distance 1175. Similarly, second elongate bulge 1125 may extend from adjacent portions of first chamber barrier layer 1105 by a second distance 1180. In some embodiments, as shown in FIG. 12, first distance 1175 may be greater than second distance 1180. Since first elongate bulge 1120 has a length that is significantly greater than width 1130, the height (first distance 1175) of first elongate bulge 1120 may be determined by first width 1130. Similarly, the height (second distance 1180) of second elongate bulge 1125 may be determined by second width 1135. Since first width 1130 is larger than second width 1135, the height (first distance 1175) of first elongate bulge 1120 may be greater than the height (second distance 1180) of second elongate bulge 1125. As further illustrated in FIG. 12, by including first elongate bulge 1120 second elongate bulge 1125 having differing heights proximate to one another chamber 1100 may be provided with a tapering overall thickness.

As shown in FIG. 12, convex aspects of bulges can be compensated for by footbed member 1185. For example, as shown in FIG. 12, footbed member 1185 may have a first peripheral thickness 1190 proximate to a peripheral portion of chamber 1100, and footbed member 1185 may have a second central thickness 1195 proximate to a central portion of chamber 1100. As shown in FIG. 12, in some embodiments, first peripheral thickness 1190 may be greater than second central thickness 1195. Accordingly, footbed member 1185 may taper from first peripheral thickness 1190 to second central thickness 1195. Further, footbed member 1185 may be configured to accommodate first elongate bulge 1120 and second elongate bulge 1125. In some embodiments, an underside of footbed member 1185 may have one or more pre-formed recesses configured to receive first elongate bulge 1120 and second elongate bulge 1125. In some embodiments, footbed member 1185 may be formed of a compressible material. In such embodiments, footbed member 1185 may compress to receive first elongate bulge 1120 and second elongate bulge 1125 or any other bulges in chamber 1100, to thereby at least partially conform to the contours of chamber 1100. It will be noted that, the compressibility, flexibility, hardness, and other properties of footbed member 1185 may differ from those of chamber 1100. For example, in some embodiments, footbed member 1185 may be more or less compressible than chamber 1100. In particular, footbed member 1185 may be more or less compressible than first elongate bulge 1120 and second elongate bulge 1125. In such embodiments, the less compressible component may provide more control, stability, and support, whereas the more compressible component may provide more cushioning and comfort. The combination of components may be configured to provide desired levels of these properties according to activities for which the article of footwear is configured.

As shown in FIG. 12, the tapered thickness of chamber 1100 provided by the difference in height of first elongate bulge 1120 and second elongate bulge 1125 may provide a concavity configured to receive the foot of a wearer. For example, as shown in FIG. 12, a first portion 1205 of first elongate bulge 1120 and a second portion 1210 of second elongate bulge 1125 may form a concavity, which, in a cross-section, has an arc 1225. In some embodiments, arc 1225 may be substantially parallel a curvature of upper surface 1215 of footbed member 1185. Further, arc 1225 and upper surface 1215 may have a curvature that is substantially similar to lower surface 1220 of foot 1200.

Figure 13:
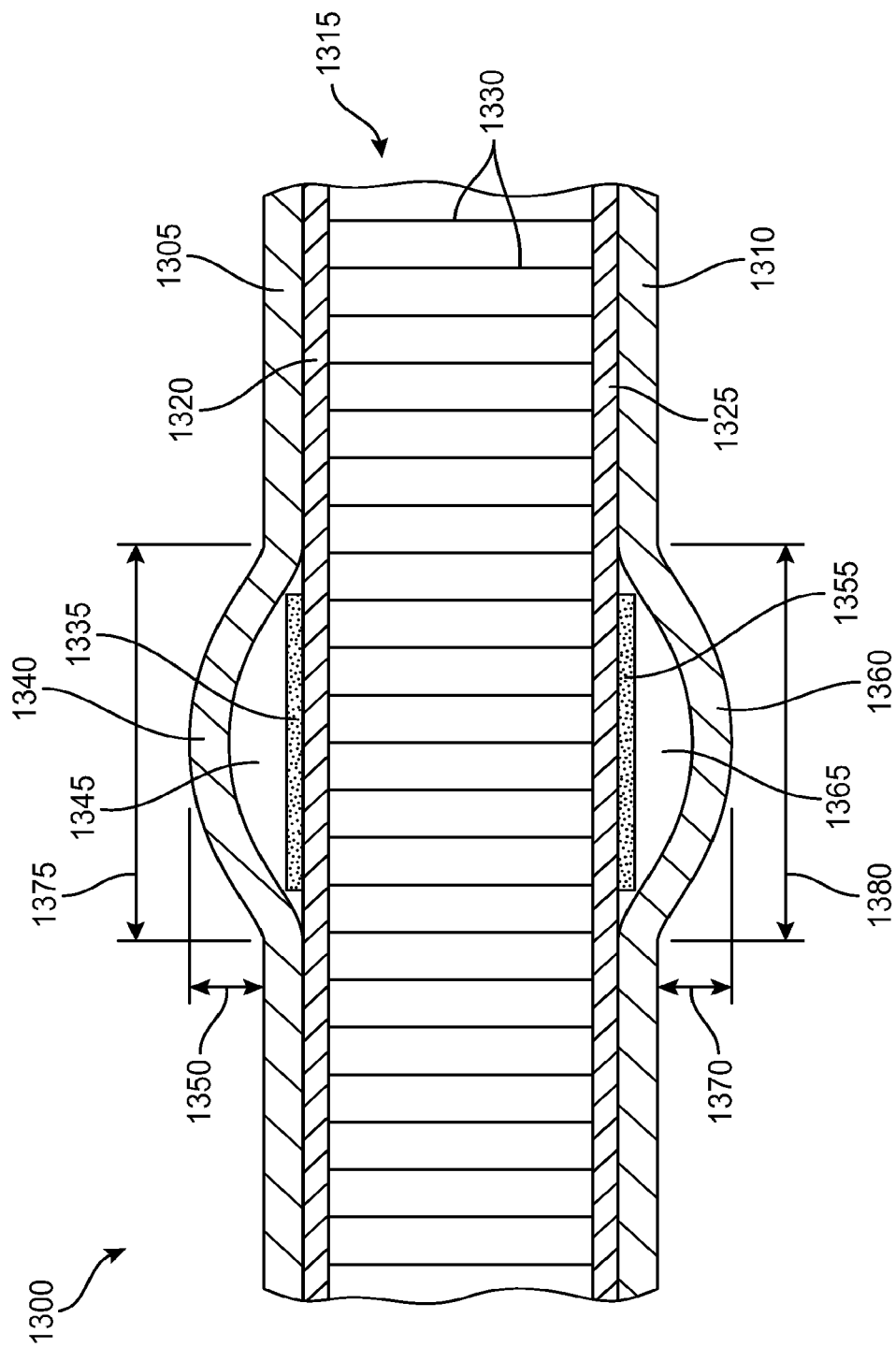
FIG. 13 shows an assembled, cross-sectional view of another exemplary fluid-filled chamber.

FIG. 13 shows an assembled, cross-sectional view of another exemplary fluid-filed chamber embodiment. As shown in FIG. 13, a chamber 1300 may include a first chamber barrier layer 1305 and a second chamber barrier layer 1310. Chamber 1300 may also include a tensile member 1315, which may include a first tensile member layer 1320 and a second tensile member layer 1325. A plurality of tethers 1330 may extend between first tensile member layer 1320 and second tensile member layer 1325. The characteristics of these components may be the same or similar to corresponding components of other embodiments discussed above.

In some embodiments, chamber 1300 may include bond inhibiting material on opposing sides of chamber 1300. By including bond inhibiting material on opposing sides of the chamber, bulges may be provided on both sides. This may enable chamber 1300 to be formed with a greater amount of contouring. For example, as shown in FIG. 13, a first bond inhibiting material 1335 may be provided to prevent bonding between first chamber barrier layer 1305 and tensile member 1315. Accordingly, first bond inhibiting material 1335 may form a first bulge 1340. First bulge 1340 may define a first void 1345 filled with the pressurized fluid within chamber 1300. Chamber 1300 may also include a second bond inhibiting material 1355 preventing bonding between second chamber barrier layer 1310 and tensile member 1315. Second bond inhibiting material 1355 may form a second bulge 1360, defining a second void 1365. In some embodiments, first bond inhibiting material 1335 may be the same material as second bond inhibiting material 1355. In other embodiments, first bond inhibiting material 1335 may be a different material than second bond inhibiting material 1355.

In some embodiments, second bulge 1360 may be disposed opposite first bulge 1340. In addition, in some embodiments, first bond inhibiting material 1335 may have substantially the same size and shape as second bond inhibiting material 1355. In such embodiments, first bulge 1340 and second bulge 1360 may have substantially the same size and shape. Accordingly, in some embodiments, chamber 1300 may have top and bottom sides with substantial mirror images.

As shown in FIG. 13, first bulge 1340 may have a first height 1350 and a first width 1375. Second bulge 1360 may have a second height 1370 and a second width 1380. In some embodiments, first height 1350 may be substantially the same as second height 1370. In other embodiments, first height 1350 may be different than second height 1370. In some embodiments, first width 1375 may be substantially the same as second width 1380. In other embodiments, first width 1375 may be different than second width 1380.

Figure 14:
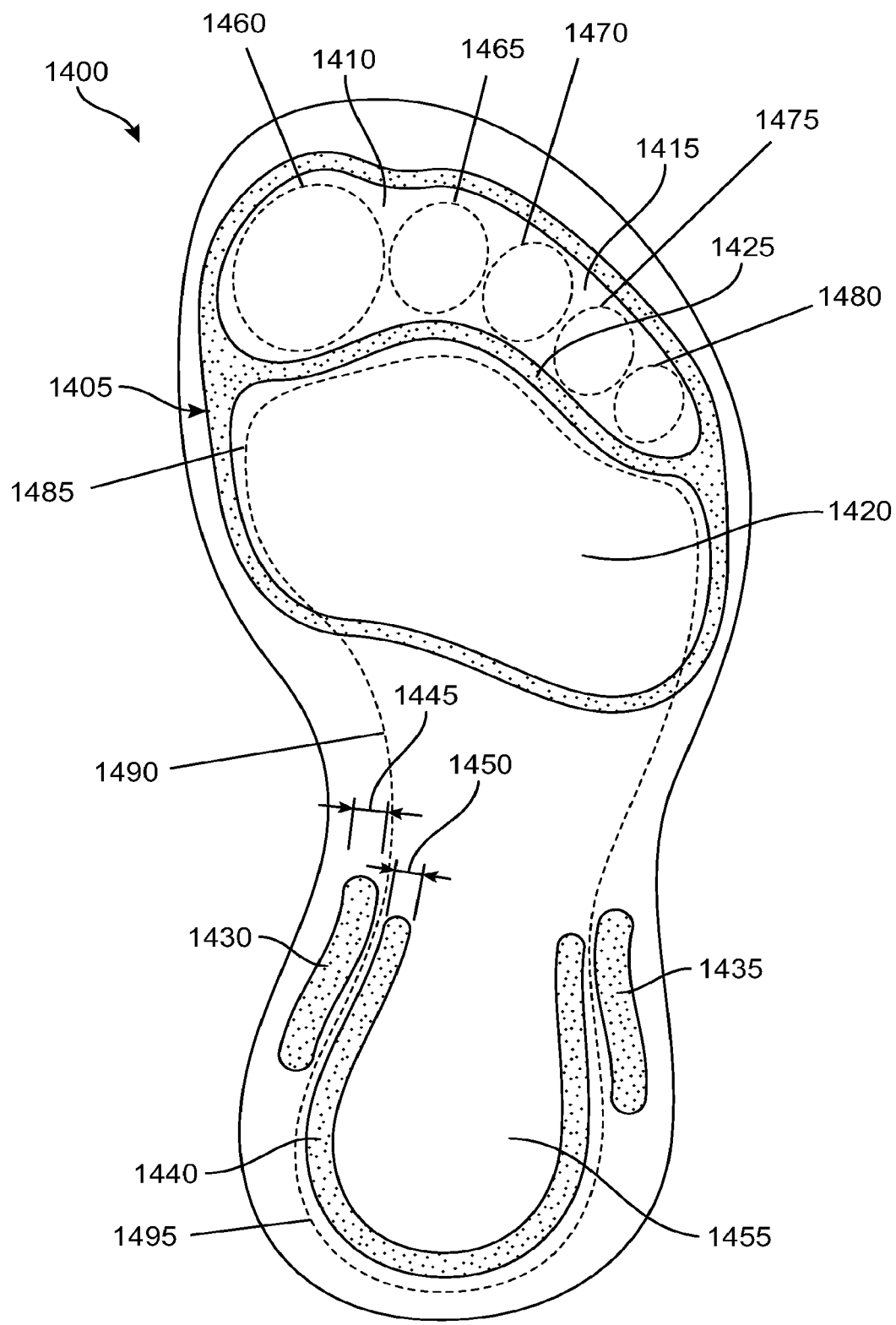
FIG. 14 shows a top view of a chamber having anatomical contour features.

FIG. 14 shows a top view of a chamber having anatomical contour features. As shown in FIG. 14, a chamber 1400 may include bulges forming anatomical contours. Such bulges may be formed using any of the bond prevention techniques disclosed herein. FIG. 14 illustrates a foot of a wearer using dashed lines indicating approximate outlines of portions of the foot. As shown in FIG. 14, chamber 1400 may include a forefoot area bulge 1405 configured to receive forefoot portions of the wearer's foot. For example, forefoot area bulge 1405 may substantially encircle a first area 1420 configured to receive the ball of the foot 1485. In addition, bulge 1405 may define a separate area for receiving the toes of the foot. For example, bulge 1405 may include a hallux region 1410 configured to receive a hallux 1460 (first toe) of the foot. In addition, bulge 1405 may also define a secondary toe region 1415 configured to receive a second toe 1465, a third toe 1470, a fourth toe 1475, and a fifth toe 1480. Although not shown in FIG. 14, in some embodiments, chamber 1400 may include contouring configured to receive portions of a midfoot 1490 of the wearer's foot.

In the heel region of chamber 1400, a substantially U-shaped bulge 1440 may be configured to partially encircle a depression or heel cup area 1455. In some embodiments, the heel region may further include a medial support bulge 1430 and a lateral support bulge 1435. Medial support bulge 1430 and lateral support bulge 1435 may provide additional contouring to accommodate a heel 1495 of a foot. In order to provide this additional contouring, medial support bulge 1430 and/or lateral support bulge 1435 may extend further from adjacent portions of chamber 1400 than U-shaped bulge 1440. As shown in FIG. 14, medial bulge 1430 may have a first width 1445 and U-shaped bulge 1440 may have a second width 1450. In some embodiments, first width 1445 may be greater than second width 1450, thereby providing medial bulge 1430 with a taller profile than U-shaped bulge. In cross-section, the heel region of the FIG. 14 configuration may be similar to the embodiment shown in FIG. 12.

In some embodiments, multiple chambers may be formed simultaneously. For example, the various layers of the chamber may be formed from sheets of the respective layer materials. In some cases, multiple chambers may be formed from the same sheets of materials. For example, in some embodiments, four chambers may be formed from a single stacked arrangement of chamber layers.

Figure 15:
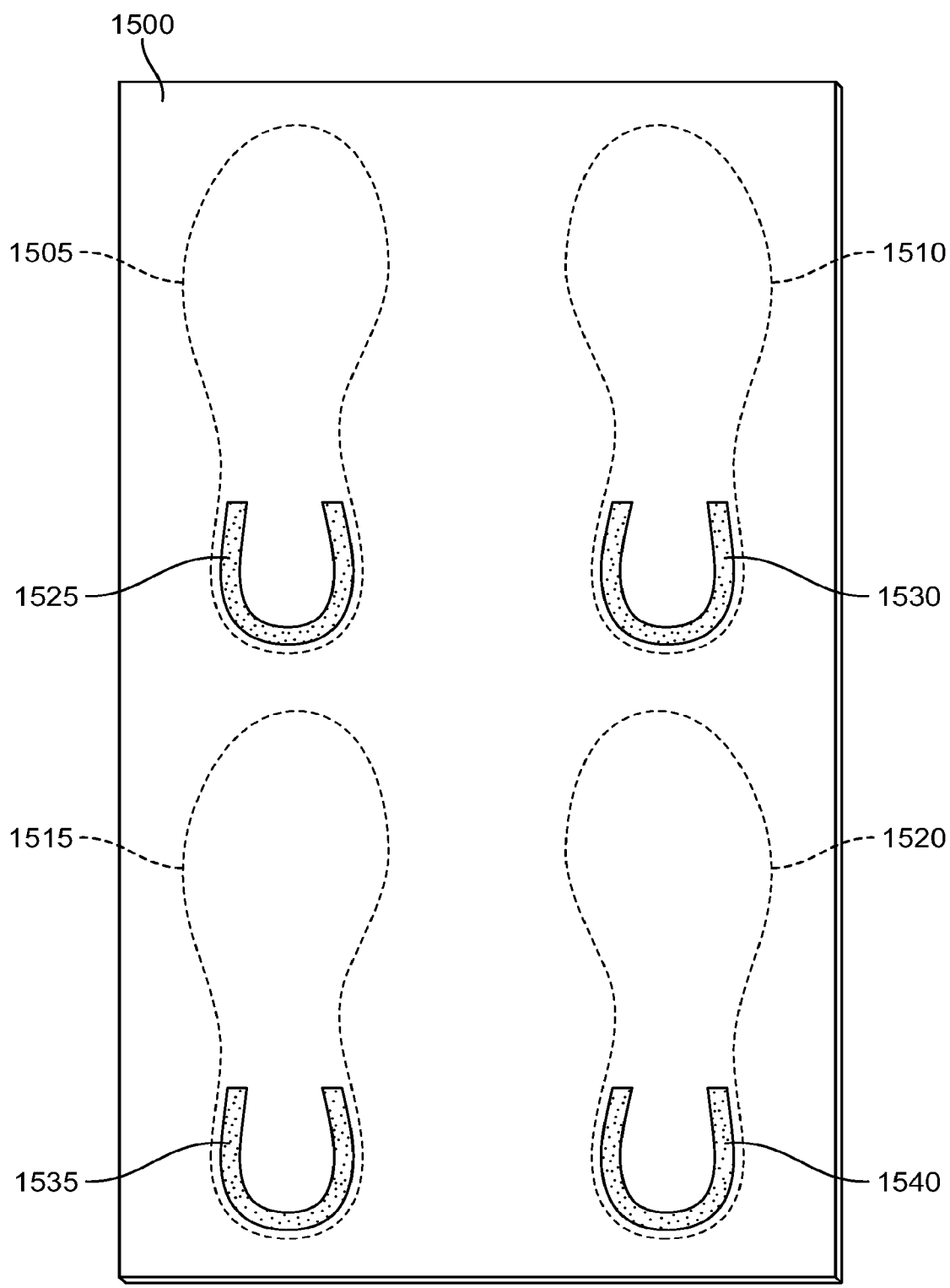
FIG. 15 illustrates a sheet of adhesive material including bond inhibiting material applied to select portions of the sheet.

FIG. 15 illustrates an adhesive material sheet 1500. Adhesive material sheet 1500 may be a hot melt layer (e.g., thermoplastic), such as first adhesive layer 325 and second adhesive layer 320, as shown in FIG. 7 and discussed above. As shown in FIG. 15, adhesive material sheet 1500 may be configured to be used to form multiple chambers. For example, dashed lines indicate approximate outlines illustrating the boundaries of foot-shaped chambers that may be formed from adhesive material sheet 1500. FIG. 15 shows a first chamber outline 1505, a second chamber outline 1510, a third chamber outline 1515, and a fourth chamber outline 1520. It will be noted that the number of chambers formed from adhesive material sheet 1500 may vary, and any suitable number of chambers may be formed from a single stacked arrangement of chamber layers.

In some embodiments, bond inhibiting material may be applied to select portions of adhesive material sheet 1500. The application of bond inhibiting material may be performed before or after the bonding of adhesive material sheet 1500 to other chamber layers, such as a tensile member. As shown in FIG. 15, bond inhibiting materials may be selectively placed on adhesive material sheet 1500 in a predetermined arrangement corresponding with portions of adhesive material sheet that will be used in forming the chambers. For example, as shown in FIG. 15, a first bond inhibiting material 1525 may be disposed in an area corresponding with first chamber outline 1505. Similarly, a second bond inhibiting material 1530 may be disposed in an area corresponding with second chamber outline 1510. A third bond inhibiting material 1535 may be disposed in an area corresponding with third chamber outline 1515. A fourth bond inhibiting material 1540 may be disposed in an area corresponding with fourth chamber outline 1520. In some embodiments, two or more of the bond inhibiting materials applied to adhesive material sheet 1500 may be different may be the same. In some embodiments, the bond inhibiting materials applied to adhesive material sheet 1500 may be different.

Figure 16:
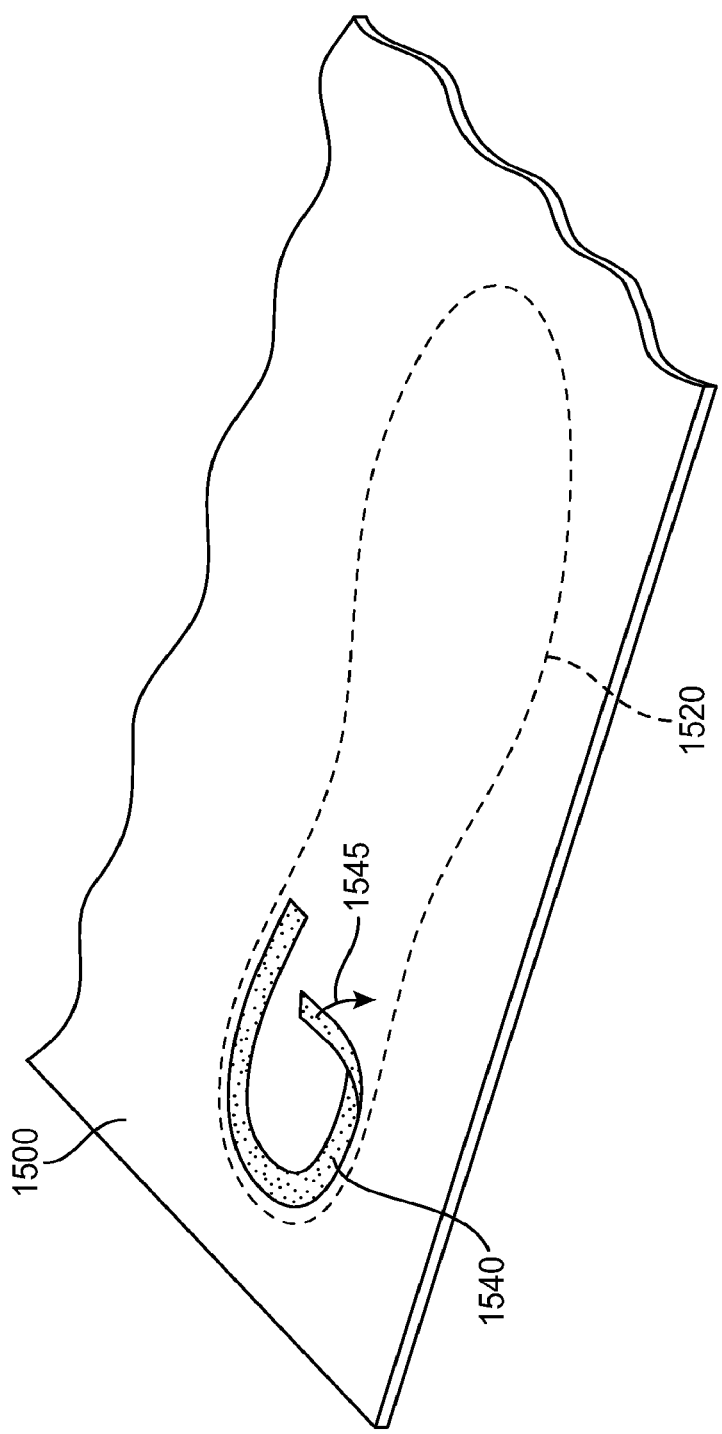
FIG. 16 is a perspective view of a portion of a sheet of adhesive material with a strip of bond inhibiting material being applied to the sheet.

Bond inhibiting material may be applied to adhesive material sheet 1500 (or other chamber layers, such as chamber barrier layers) using any suitable method. In some embodiments, bond inhibiting materials may be pre-formed strips that are applied to adhesive material sheet. For example, FIG. 16 is a perspective view of a portion of adhesive material sheet 1500. FIG. 16 illustrates fourth bond inhibiting material 1540 being applied as a pre-formed strip to adhesive material sheet 1500. An arrow 1545 illustrates fourth bond inhibiting material 1540 being applied in a similar manner to a piece of tape.

In some embodiments, bond inhibiting material may be applied to adhesive material sheets (or other chamber layers) using a transfer method. For example, applying the bond inhibiting material to the layer of adhesive material may include aligning a transfer sheet including one or more selectively placed strips of bond inhibiting material with a sheet of adhesive material. The method may further include pressing the transfer sheet against the sheet of adhesive material, thereby transferring the strip of bond inhibiting material from the transfer sheet to the sheet of adhesive material.

Figure 17:
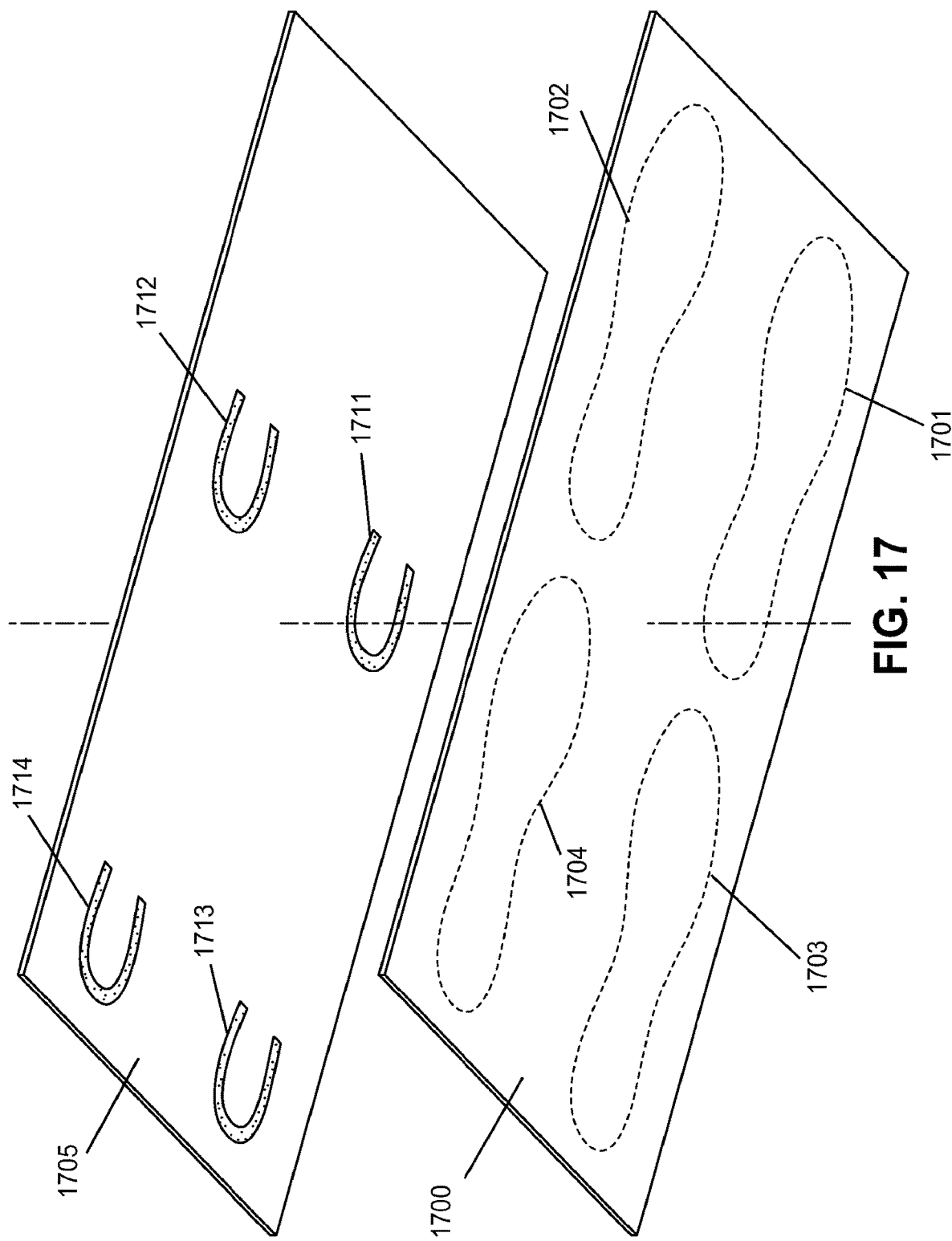
FIG. 17 illustrates bond inhibiting material strips on a transfer sheet, configured for transfer onto a sheet of adhesive material.

FIG. 17 illustrates an adhesive material sheet 1700 and a transfer sheet 1705. Chamber outlines are shown on adhesive material sheet 1700 in phantom by dashed lines. For example, FIG. 17 shows a first chamber outline 1701, a second chamber outline 1702, a third chamber outline 1703, and a fourth chamber outline 1704. Adhesive material may be pre-applied to transfer sheet 1705 in select locations. For example, as shown in FIG. 17. a first bond material 1711, a second bond inhibiting material 1712, a third bond inhibiting material 1713, and a fourth bond inhibiting material 1714 may be pre-applied to transfer sheet 1705 in locations that correspond with the chamber outlines of adhesive material sheet 1700.

Figure 18:
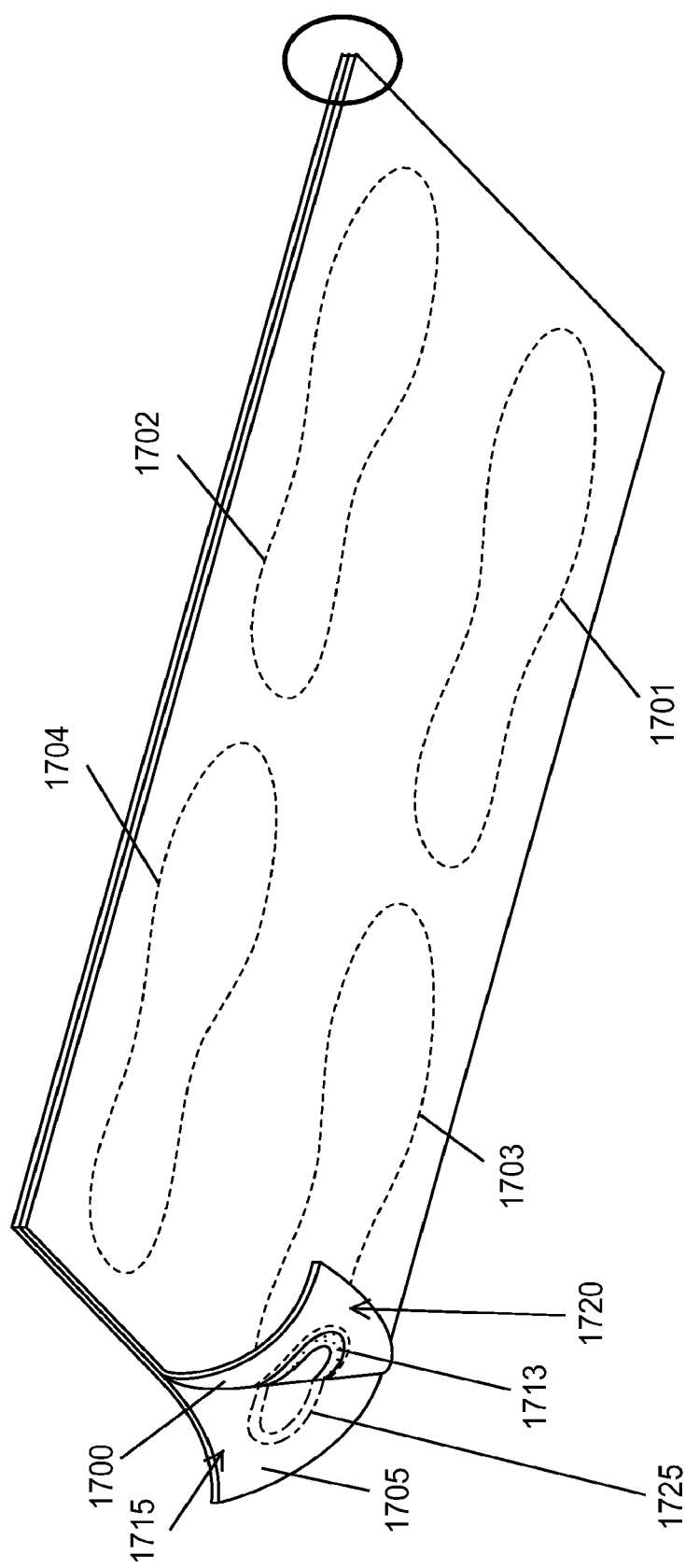
FIG. 18 illustrates a process of applying the bond inhibiting materials strips from the transfer sheet of FIG. 17 onto the sheet of adhesive material.

As shown in FIG. 18, transfer sheet 1705 may be pressed against adhesive material sheet 1700. Pressure may transfer the bond inhibiting material onto adhesive material sheet 1700. In some embodiments, the transfer may also be effectuated not only by pressure, but also by the application of heat, water, or other techniques for releasing the bond inhibiting material from transfer sheet 1705. FIG. 18 shows a first corner portion 1715 of transfer sheet 1705 being peeled away from a second corner portion 1720 of adhesive material sheet 1700. In the peeled back portion, FIG. 18 illustrates third adhesive material 1713 transferred onto adhesive material sheet 1700. FIG. 18 also shows a phantom outline 1725 indicating where third adhesive material 1713 had been located on transfer sheet 1705.

Figure 19:
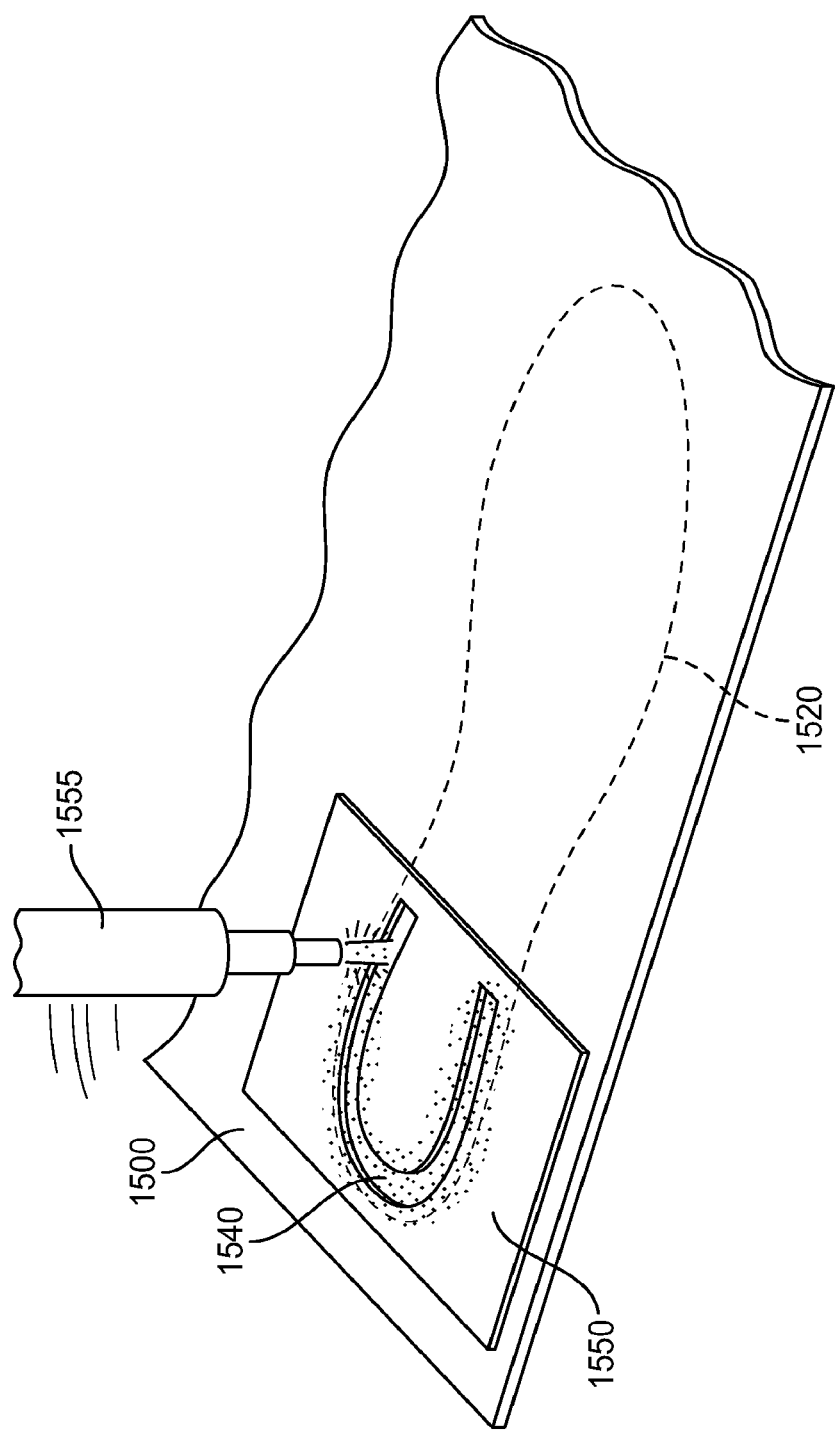
FIG. 19 illustrates a process of spraying bond inhibiting material, in liquid form, onto a portion of a sheet of adhesive material using a stencil.

In some embodiments, applying the bond inhibiting material to the layer of adhesive material may include spraying bond inhibiting material, in liquid form, onto the layer of adhesive material. As shown in FIG. 19, an application device 1555 may be used to apply bond inhibiting material to adhesive material sheet 1500. For example, FIG. 19 shows fourth bond inhibiting material 1540 being sprayed onto adhesive material sheet 1500. As shown in FIG. 19, a stencil 1550 may be used to ensure application of bond inhibiting material only to desired locations of adhesive material sheet 1500. In some embodiments, however, bond inhibiting material may be applied by spray application without using a stencil.

Figure 20:
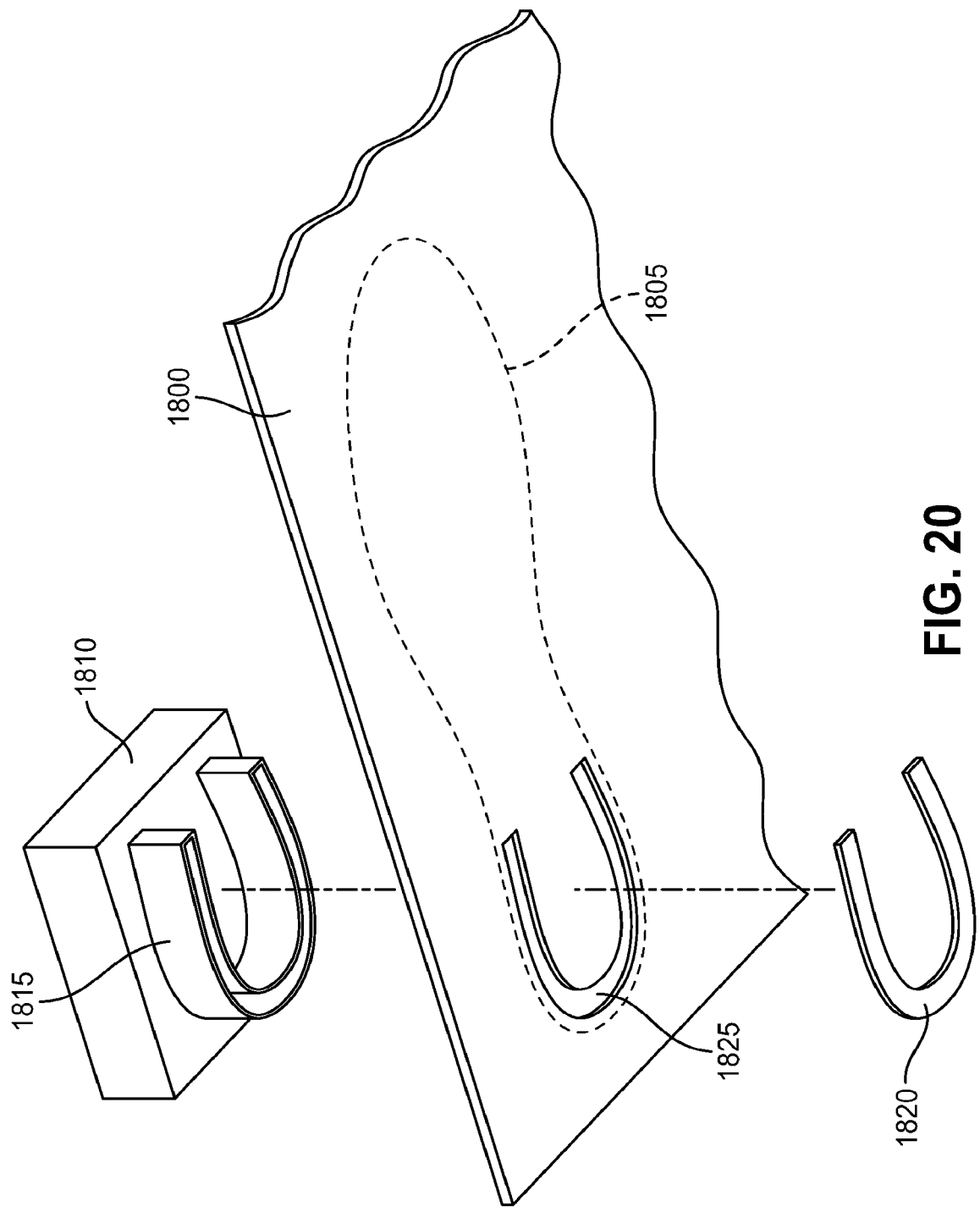
FIG. 20 illustrates a process of cutting an opening in a sheet of adhesive material.

In some embodiments, bonding between chamber barrier layers and a tensile member may be prevented by selectively omitting adhesive material between the barrier layers and the tensile member. FIG. 20 illustrates a process of cutting an opening 1825 in an adhesive material sheet 1800. Opening 1825 may be cut within an area designated for use in forming a chamber. For example, a chamber outline 1805 is shown in phantom by a dashed line.

Opening 1825 may be formed using any suitable method. For example, as shown in FIG. 20, in some embodiments, opening 1825 may be cut out of adhesive material sheet 1800. Cutting of opening 1825 may be performed using any suitable method. For example, as shown in FIG. 20, a die cutting process may be used to remove a section 1820 of adhesive material layer 1800 to form opening 1825. A die 1810 may include a cutting element 1815, which may be formed in the shape of the desired opening to be formed in adhesive material sheet 1800. Upon die stamping adhesive material sheet 1800 using die 1810, section 1820 of adhesive material sheet 1800 may be cut out, as shown in FIG. 20.

Figure 21:
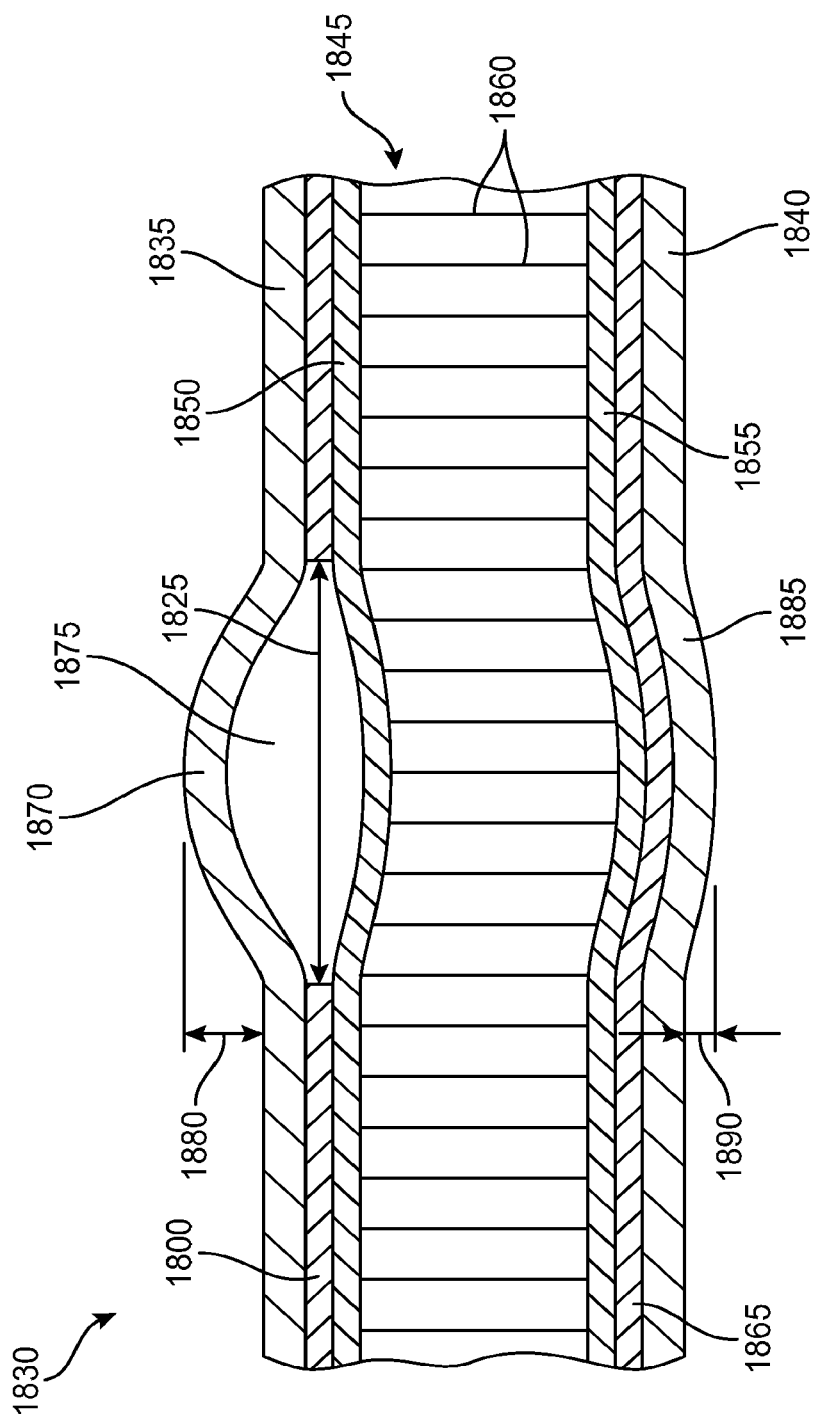
FIG. 21 shows a cross-sectional view of an exemplary fluid-filled chamber formed using a sheet of adhesive material having an opening.

FIG. 21 shows a cross-sectional view of an exemplary fluid-filled chamber having a bulge formed by omitting adhesive material in a select location between the chamber barrier layer and the tensile member. For example, adhesive material sheet 1800, formed for example using the method shown in FIG. 20, may be used to form a chamber 1830. Chamber 1830 may include a first chamber barrier layer 1835 and a second chamber barrier layer 1840. A tensile member 1845 may extend between first chamber barrier layer 1835 and second chamber barrier layer 1840. Tensile member 1845 may include a first tensile member layer 1850, a second tensile member layer 1855, and a plurality of tethers 1860. Tensile member 1845 may be configured similarly to other tensile members shown and discussed in other embodiments disclosed herein.

As shown in FIG. 21, adhesive material sheet 1800 may bond portions of first chamber barrier layer 1835 to tensile member 1845. In addition, a second adhesive material sheet 1865 may bond second chamber barrier layer 1840 to tensile member 1845. Opening 1825 in adhesive material sheet 1800 may form an unbonded area by preventing bonding of first chamber barrier layer 1835 to tensile member 1845 in the area of opening 1825. Chamber 1830 may include an outwardly extending first bulge 1870 in the unbonded area corresponding with the location of opening 1825 in adhesive material sheet 1800. It will be noted that bulges formed in unbonded areas corresponding with openings in adhesive material layers may have any suitable configuration. For example, the anatomical contours shown in other embodiments disclosed herein may be formed in this manner (as opposed to using bond inhibiting material).

As shown in FIG. 21, first bulge 1870 may extend from adjacent portions of first chamber barrier layer 1835 by a first distance 1880, thus forming a void 1875 upon pressurization of chamber 1830. In a similar fashion to that discussed above with regard to the embodiment shown in FIG. 10, a second bulge 1885 may be formed opposite first bulge 1870 due to the lack of anchoring of tensile member 1845 opposite second bulge 1885. As shown in FIG. 21, second bulge 1885 may extend from adjacent portions of second chamber barrier layer 1840 by a second distance 1890. In some embodiments, first distance 1880 may be greater than second distance 1890.

It will be noted that, although exemplary chambers disclosed herein are shown with bulges on an upper side, in some embodiments, the bulges may be provided on the lower side of the chamber. Accordingly, in some embodiments, the lower barrier layer may extend downward creating contours on a lower surface of the chamber. That is, the chambers may be configured with arrangements that are essentially upside down from that shown in the accompanying figures. This may facilitate nesting of the chamber with a contoured midsole and/or outsole.

It will be noted that the disclosed chamber configurations and tensile member arrangements may be implemented in articles other than footwear. For example, such chambers may be used for other articles such as garments and sporting equipment. In some cases, such chambers may be used to provide padding for sports garments, and the disclosed bulges in the chamber may provide contouring that enables the padding to conform to the curvatures of various parts of the body. In other cases, such chambers may be used to provide padding in sports equipment, such as baseball gloves, catchers padding, lacrosse and football pads, and other such equipment.

While various embodiments of the invention have been described, the description is intended to be exemplary, rather than limiting and it will be apparent to those of ordinary skill in the art that many more embodiments and implementations are possible that are within the scope of the invention. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination and that features of one embodiment may be implemented in other disclosed embodiments. Accordingly, the invention is not to be restricted except in light of the attached claims and their equivalents. Also, various modifications and changes may be made within the scope of the attached claims.

What is claimed is:

1. A sole structure for an article of footwear, the sole structure comprising:
   a fluid-filled chamber including a first barrier layer including a first inner surface and a second barrier layer including a second inner surface joined to the first inner surface of the first barrier layer, the first barrier layer and the second barrier layer cooperating to define an interior void;
   a tensile element disposed within the interior void and including a first tensile layer having a first surface opposing and directly attached to the first inner surface of the first barrier layer, a second tensile layer opposing and attached to the second barrier layer, and a plurality of tensile members extending between the first tensile layer and the second tensile layer; and
   an elongate bond inhibiting material disposed between the first surface of the first tensile layer and the first inner surface of the first barrier layer in a forefoot region of the fluid-filled chamber and spaced apart from a peripheral edge of the fluid-filled chamber, the elongate bond inhibiting material operable to prevent bonding between the first surface of the first tensile layer and the first inner surface of the first barrier layer.

2. The sole structure of claim 1, wherein the elongate bond inhibiting material includes a longitudinal axis extending in a direction between a medial side of the fluid-filled chamber and a lateral side of the fluid-filled chamber.

3. The sole structure of claim 1, wherein the elongate bond inhibiting material includes a first distal end spaced apart from and opposing a medial side of the fluid-filled chamber and a second distal end spaced apart from and opposing a lateral side of the fluid-filled chamber.

4. The sole structure of claim 1, further comprising a perimeter bond inhibiting material disposed between the first surface of first tensile layer and the first inner surface of the first barrier layer and extending around at least a portion of a perimeter of the fluid-filled chamber.

5. The sole structure of claim 4, wherein the elongate bond inhibiting material is spaced apart from the perimeter bond inhibiting material.

6. The sole structure of claim 4, wherein the elongate bond inhibiting material includes a first distal end spaced apart from and opposing a first portion of the perimeter bond inhibiting material and a second distal end spaced apart from and opposing a second portion of the perimeter bond inhibiting material.

7. The sole structure of claim 6, wherein the first portion of the perimeter bond inhibiting material extends along a medial side of the fluid-filled chamber and the second portion of the perimeter bond inhibiting material extends along a lateral side of the fluid-filled chamber.

8. The sole structure of claim 4, wherein the perimeter bond inhibiting material extends continuously around the entire perimeter of the fluid-filled chamber.

9. The sole structure of claim 4, wherein the perimeter bond inhibiting material completely surrounds the elongate bond inhibiting material.

10. An article of footwear incorporating the sole structure of claim 1.

11. A sole structure for an article of footwear, the sole structure comprising:
    a fluid-filled chamber including a first barrier layer having a first inner surface and a second barrier layer having a second inner surface joined to the first inner surface of the first barrier layer, the first barrier layer and the second barrier layer cooperating to define an interior void;
    a tensile element disposed within the interior void and including a first tensile layer having a first surface opposing and directly attached to the first inner surface of the first barrier layer, a second tensile layer opposing and attached to the second barrier layer, and a plurality of tensile members extending between the first tensile layer and the second tensile layer; and
    a bond inhibiting material disposed between the first surface of the first tensile layer and the first inner surface of the first barrier layer around a peripheral edge of the fluid-filled chamber and including (i) a first portion having a first width in a forefoot region of the fluid-filled chamber and (ii) a second portion having a second width greater than the first width in a midfoot region of the fluid-filled chamber, the bond inhibiting material operable to prevent bonding between the first surface of the first tensile layer and the first inner surface of the first barrier layer.

12. The sole structure of claim 11, wherein the second portion of the bond inhibiting material is disposed at a medial side of the fluid-filled chamber.

13. The sole structure of claim 11, wherein the second portion of the bond inhibiting material extends along a medial side of the fluid-filled chamber.

14. The sole structure of claim 11, wherein the bond inhibiting material includes a third portion extending around the peripheral edge of the fluid-filled chamber in a heel region of the fluid-filled chamber.

15. The sole structure of claim 14, wherein the first portion, the second portion, and the third portion of the bond inhibiting material cooperate to continuously extend around an entire perimeter of the fluid-filled chamber.

16. The sole structure of claim 14, wherein the bond inhibiting material includes a first junction connecting the second portion of the bond inhibiting material to the first portion of the bond inhibiting material and a second junction connecting the second portion of the bond inhibiting material to the third portion of the bond inhibiting material.

17. The sole structure of claim 16, wherein the first junction decreases in width from the second portion of the bond inhibiting material to the first portion of the bond inhibiting material.

18. The sole structure of claim 17, wherein the second junction decreases in width from the second portion of the bond inhibiting material to the third portion of the bond inhibiting material.

19. The sole structure of claim 11, wherein the fluid-filled chamber is pressurized.

20. An article of footwear incorporating the sole structure of claim 11.

* * * * *